United States Patent [19]

Hasebe et al.

[11] Patent Number: 4,903,142

[45] Date of Patent: Feb. 20, 1990

[54] APPARATUS FOR PROCESSING HALFTONE IMAGE

[75] Inventors: Takashi Hasebe; Seiichiro Hiratsuka, both of Hachioji; Yoshinori Abe, Hino; Masahiko Matsunawa, Fussa, all of Japan

[73] Assignee: Konica Corporation, Tokyo, Japan

[21] Appl. No.: 372,159

[22] Filed: Jun. 27, 1989

Related U.S. Application Data

[63] Continuation of Ser. No. 118,945, Nov. 10, 1987, abandoned.

[30] Foreign Application Priority Data

Nov. 14, 1986 [JP] Japan ................. 61-272562

[51] Int. Cl.$^4$ .............................................. H04N 1/40
[52] U.S. Cl. .................... 358/457; 358/458; 358/459
[58] Field of Search ................ 358/456, 457, 458, 459

[56] References Cited

U.S. PATENT DOCUMENTS

| | | | |
|---|---|---|---|
| 4,667,251 | 5/1987 | Hasegawa | 358/283 |
| 4,698,688 | 10/1987 | Ochi | 358/283 |
| 4,701,811 | 10/1987 | Moriguchi | 358/283 |
| 4,717,964 | 1/1988 | Abe | 358/283 |
| 4,741,046 | 4/1988 | Matsunawa | 358/283 |
| 4,752,822 | 6/1988 | Kawamura | 358/283 |

Primary Examiner—Howard W. Britton
Attorney, Agent, or Firm—Finnegan, Henderson, Farabow, Garrett and Dunner

[57] ABSTRACT

The present invention provides an image processing apparatus for estimating a halftone image from an original binary coded image, wherein there are provided a plurality of line memories for introducing the original binary coded image data and for transferring the data into a shift-register being set therein plural kinds of scanning windows, a computing circuit for counting black pixels within each of the plural kinds of scanning windows, a density pattern-discriminating circuit for performing the comparison judgment between the original binary image and the rebinary image based on the computed value, a conditional formula circuit for performing conditional inequality algorism, and a window judgment circuit having a predetermined truth table for selecting one optimum scanning window.

23 Claims, 32 Drawing Sheets

FIG. 2-c
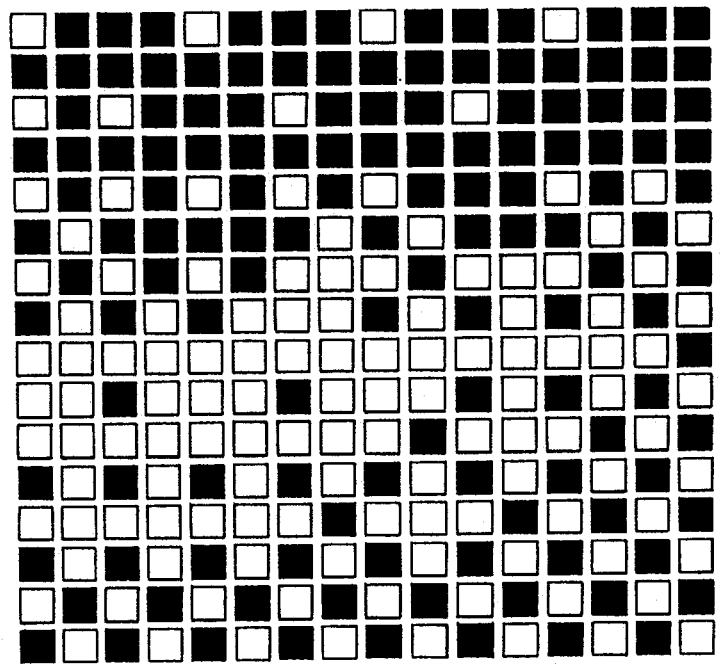

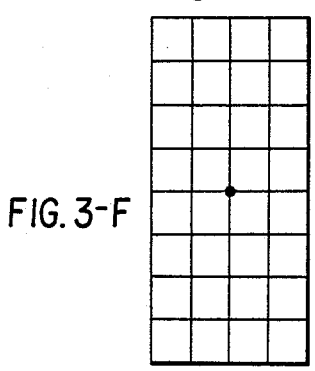
FIG. 3-F
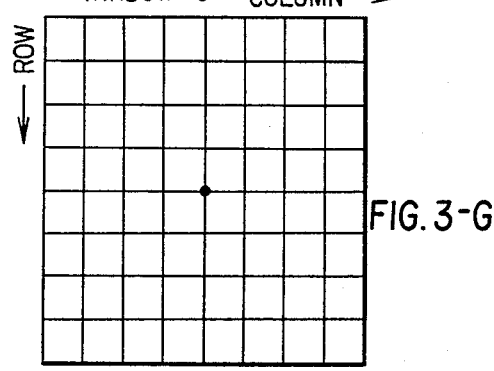
FIG. 3-G
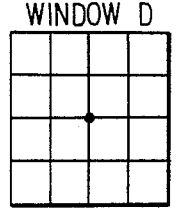
FIG. 3-D
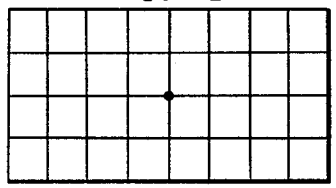
FIG. 3-E
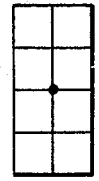
FIG. 3-C
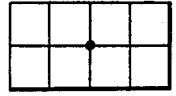
FIG. 3-B
FIG. 3-Z
FIG. 3-A

WINDOW Z

WINDOW A

WINDOW B

WINDOW C

WINDOW D
```
12 12 16 16 20 16 12 12 12
16 16 24 24 28 24 20 20 20
24 28 39 36 40 32 28 28 28
32 36 44 44 48 44 40 40 40
44 48 52 52 52 48 48 44 44
52 56 56 56 52 48 48 44 44
52 52 52 52 48 48 48 44 44
52 52 48 48 44 44 44 40 36
48 48 44 44 40 40 40 40 36
```

FIG.4-f

WINDOW E
```
18 16 16 14 14 14 16 14 14
22 22 22 20 22 22 24 24 22
32 32 32 30 32 32 34 32 30
40 40 40 40 42 42 44 42 38
48 48 48 48 50 48 48 46 42
54 54 52 52 52 50 48 46 42
52 52 50 50 50 48 46 46 42
50 50 48 48 46 44 40 40 38
46 46 44 44 42 42 38 38 36
```

FIG.4-g

WINDOW F
```
16 18 22 22 24 20 18 18 18
22 24 28 28 30 26 24 24 24
28 30 34 34 36 32 30 28 28
34 36 40 40 40 36 34 32 32
38 40 44 44 44 40 38 36 36
42 44 46 46 46 44 42 40 38
46 48 48 48 46 44 44 42 40
48 50 46 46 44 42 42 40 38
48 48 44 44 42 42 42 40 36
```

FIG.4-h

WINDOW G
```
21 20 20 19 20 20 21 19 18
27 26 26 25 26 26 27 25 23
33 32 32 31 32 31 32 30 28
38 38 37 36 37 36 36 35 32
42 42 41 40 41 40 40 39 36
45 45 44 44 44 43 42 41 38
47 47 46 46 46 45 43 42 39
47 47 46 46 44 43 41 40 38
46 46 45 45 43 42 39 39 37
```

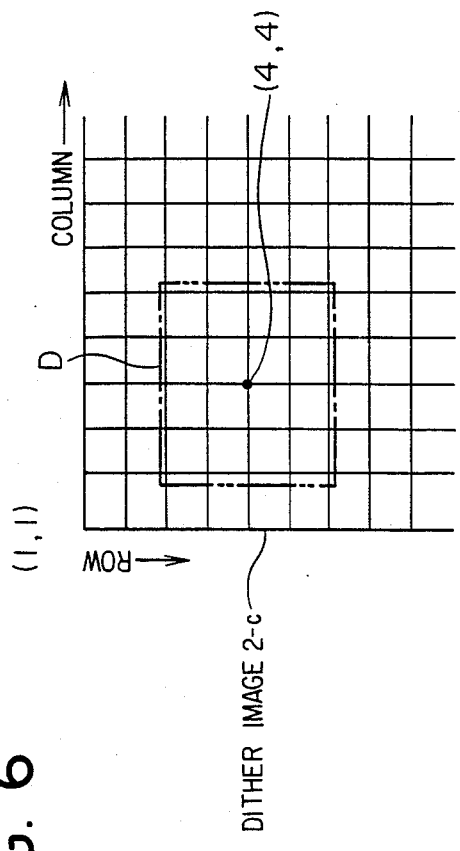
FIG. 6
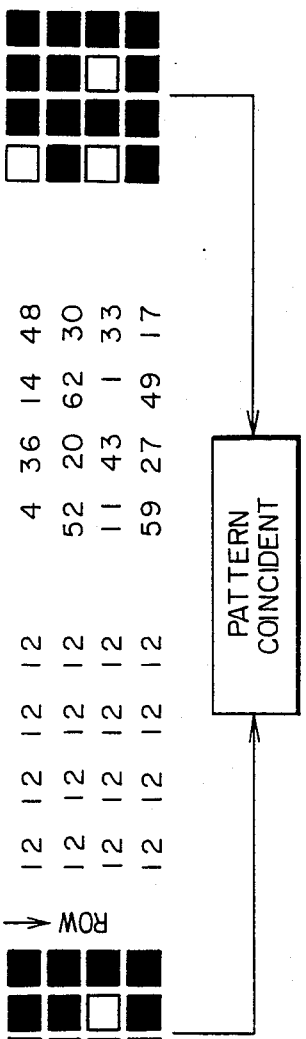
FIG.7-a  FIG.7-b  FIG.7-c  FIG.7-d
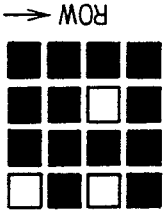
PATTERN COINCIDENT

| CONDITION | $d = 0$ OR $d = 16$ | × | × | × | × | × | × | ○ |
|---|---|---|---|---|---|---|---|---|
| | $\|2d - e\| \leq 1$ | × | × | ○ | ○ | ○ | ○ | ∗ |
| | $\|2d - f\| \leq 1$ | × | ○ | × | ○ | ○ | ○ | ∗ |
| | $\|2e - g\| \leq 1$ | ∗ | ∗ | ∗ | × | ○ | ○ | ∗ |
| | $\|2f - g\| \leq 1$ | ∗ | ∗ | ∗ | ∗ | × | ○ | ∗ |
| | WINDOW TO BE SELECTED | D | F | E | F | E | G | D |

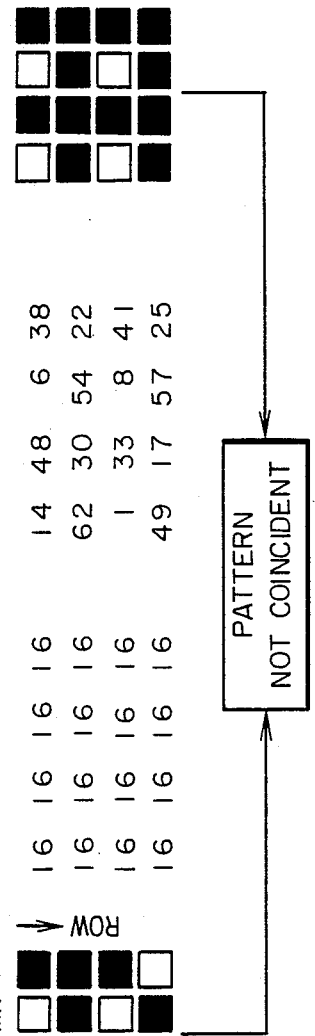
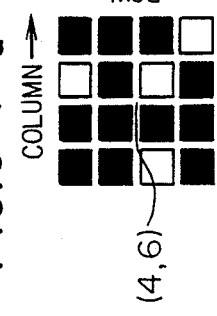
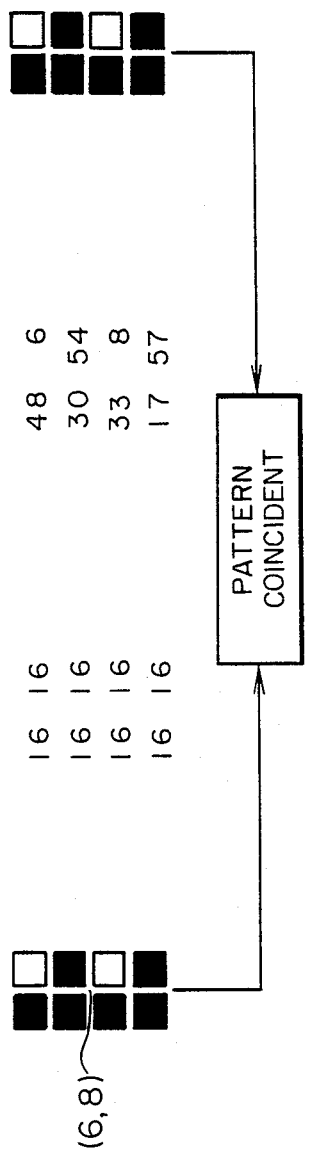
FIG.9-1-a  FIG.9-1-b  FIG.9-1-c  FIG.9-1-d
FIG.9-2-a  FIG.9-2-b  FIG.9-2-c  FIG.9-2-d
(4,6)
(6,8)
16 16 16 16    14 48  6 38
16 16 16 16    62 30 54 22
16 16 16 16     1 33  8 41
16 16 16 16    49 17 57 25
16 16          48  6
16 16          30 54
16 16          33  8
16 16          17 57
PATTERN NOT COINCIDENT
PATTERN COINCIDENT
(SELECTED WINDOW C  ESTIMATED VALUE 16)

FIG. 12-a

| | | | | | | | | |
|---|---|---|---|---|---|---|---|---|
| 12 | 12 | 16 | 16 | 16 | 8 | 8 | 8 | 8 |
| 16 | 16 | 16 | 32 | 32 | 24 | 0 | 0 | 16 |
| 16 | 16 | 16 | 48 | 40 | 40 | 32 | 0 | 0 |
| 32 | 32 | 0 | 56 | 48 | 42 | 40 | 40 | 40 |
| 48 | 56 | 56 | 56 | 58 | 48 | 48 | 46 | 42 |
| 54 | 54 | 56 | 56 | 58 | 56 | 56 | 46 | 42 |
| 52 | 52 | 50 | 50 | 56 | 64 | 40 | 42 | 42 |
| 50 | 50 | 48 | 48 | 40 | 40 | 40 | 40 | 40 |
| 46 | 46 | 40 | 40 | 43 | 42 | 38 | 39 | 32 |

FIG. 12-b

| | | | | | | | | |
|---|---|---|---|---|---|---|---|---|
| D | D | C | B | C | B | B | C | C |
| D | D | C | A | C | C | Z | A | A |
| B | B | A | A | C | B | A | Z | Z |
| C | A | Z | C | C | F | C | C | C |
| C | B | B | C | C | C | B | E | E |
| E | E | D | D | C | B | B | E | E |
| E | E | E | E | C | Z | C | F | E |
| E | F | C | B | B | B | C | G | C |
| E | E | B | C | G | G | E | G | B |

FIG. 13

| | JUDGMENT RESULT FROM WINDOW A (PATTERN) AP | JUDGMENT RESULT FROM WINDOW B (PATTERN) BP | JUDGMENT RESULT FROM WINDOW C (PATTERN) CP | JUDGMENT RESULT FROM WINDOW D (PATTERN) DP | JUDGMENT RESULT (FROM WHITE/BLACK) PIXEL NUMBERS WITHIN D, DW | JUDGMENT RESULT FROM $\lvert 2d-e \rvert \leq 1$, S1 | JUDGMENT RESULT FROM $\lvert 2d-f \rvert \leq 1$, S2 | JUDGMENT RESULT FROM $\lvert 2e-g \rvert \leq 1$, S3 | JUDGMENT RESULT FROM $\lvert 2f-g \rvert \leq 1$, S4 |
|---|---|---|---|---|---|---|---|---|---|
| N | L | L | L | L | | | | | |
| A | H | L | L | L | | | | | |
| B | | H | L | L | | | | | |
| C | | | H | L | | | | | |
| D | | | | H | H | | | | |
| E | | | | H | L | L | L | | |
| F | | | | H | L | H | H | L | |
| G | | | | H | L | L | H | H | |
|   | | | | H | L | H | H | | L |
|   | | | | H | L | H | H | H | H |

H: YES    L: NO    BLANK: IRRESPECTIVE OF JUDGMENT RESULT

FIG. 23

| CLOCK | k | r | OPERATION MODE OF CALCULATOR | x |
|---|---|---|---|---|
| 1 | 4 | 0 | — | — |
| 2 | 2 | 0 | ADDER | 0 |
| 3 | 3 | 0 | ADDER | 4 |
| 4 | 1 | 0 | ADDER | 6 |
| 5 | 3 | 0 | ADDER | 9 |
| 6 | 1 | 0 | ADDER | 10 |
| 7 | 4 | 0 | ADDER | 13 |
| 8 | 3 | 0 | ADDER | 14 |
| 9 | 3 | 4 | ADDER | 18 |
| 10 | 2 | 2 | ADDER | 21 |
| 11 | 2 | 3 | SUBTRACTER | 20 |

FIG. 28-a
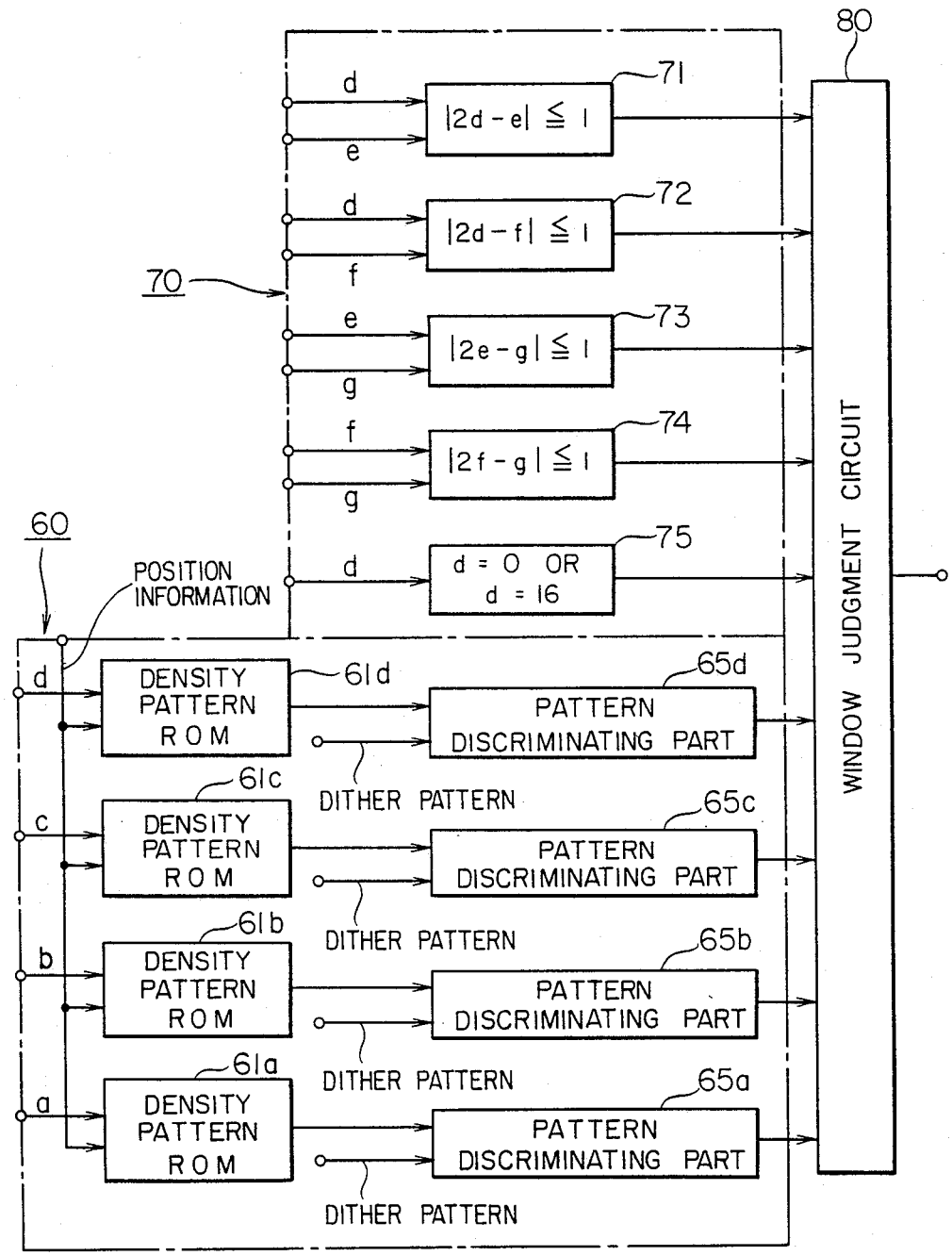

FIG. 28-b
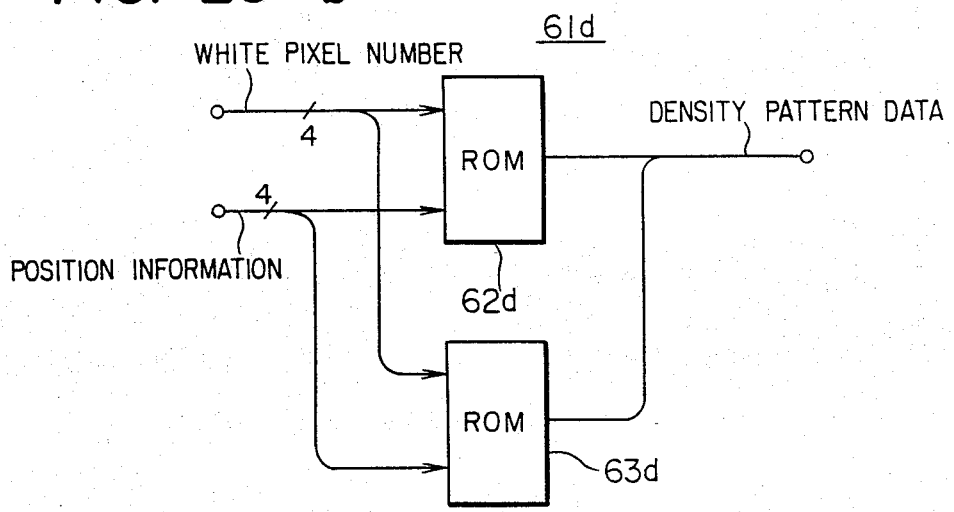
FIG. 28-c
|  |  | \multicolumn{4}{c}{LOW-ORDER BITS} |
|---|---|---|---|---|---|
|  |  | 0 0 | 0 1 | 1 0 | 1 1 |
| HIGH-ORDER BITS | 0 0 | 0 0 0 0<br>0 0 0 0<br>0 0 1 0<br>0 0 0 0 | 0 0 0 0<br>0 0 0 0<br>0 1 0 0<br>0 0 0 0 | 0 0 0 0<br>0 0 0 0<br>1 0 0 0<br>0 0 0 0 | 0 0 0 0<br>0 0 0 0<br>0 0 0 1<br>0 0 0 0 |
|  | 0 1 | 0 0 0 0<br>0 0 1 0<br>0 0 0 0<br>0 0 0 0 | 0 0 0 0<br>0 1 0 0<br>0 0 0 0<br>0 0 0 0 | 0 0 0 0<br>1 0 0 0<br>0 0 0 0<br>0 0 0 0 | 0 0 0 0<br>0 0 0 1<br>0 0 0 0<br>0 0 0 0 |
|  | 1 0 | 0 0 1 0<br>0 0 0 0<br>0 0 0 0<br>0 0 0 0 | 0 1 0 0<br>0 0 0 0<br>0 0 0 0<br>0 0 0 0 | 1 0 0 0<br>0 0 0 0<br>0 0 0 0<br>0 0 0 0 | 0 0 0 1<br>0 0 0 0<br>0 0 0 0<br>0 0 0 0 |
|  | 1 1 | 0 0 0 0<br>0 0 0 0<br>0 0 0 0<br>0 0 1 0 | 0 0 0 0<br>0 0 0 0<br>0 0 0 0<br>0 1 0 0 | 0 0 0 0<br>0 0 0 0<br>0 0 0 0<br>1 0 0 0 | 0 0 0 0<br>0 0 0 0<br>0 0 0 0<br>0 0 0 1 |
(IN THE CASE WHERE d=1)

FIG. 30

| g | e | g | e |
|---|---|---|---|
| 0 | 0 | 33 | 16, 17 |
| 1 | 0, 1 | 34 | 17 |
| 2 | 1 | 35 | 17, 18 |
| 3 | 1, 2 | 36 | 18 |
| 4 | 2 | 37 | 18, 19 |
| 5 | 2, 3 | 38 | 19 |
| 6 | 3 | 39 | 19, 20 |
| 7 | 3, 4 | 40 | 20 |
| 8 | 4 | 41 | 20, 21 |
| 9 | 4, 5 | 42 | 21 |
| 10 | 5 | 43 | 21, 22 |
| 11 | 5, 6 | 44 | 22 |
| 12 | 6 | 45 | 22, 23 |
| 13 | 6, 7 | 46 | 23 |
| 14 | 7 | 47 | 23, 24 |
| 15 | 7, 8 | 48 | 24 |
| 16 | 8 | 49 | 24, 25 |
| 17 | 8, 9 | 50 | 25 |
| 18 | 9 | 51 | 25, 26 |
| 19 | 9, 10 | 52 | 26 |
| 20 | 10 | 53 | 26, 27 |
| 21 | 10, 11 | 54 | 27 |
| 22 | 11 | 55 | 27, 28 |
| 23 | 11, 12 | 56 | 28 |
| 24 | 12 | 57 | 28, 29 |
| 25 | 12, 13 | 58 | 29 |
| 26 | 13 | 59 | 29, 30 |
| 27 | 13, 14 | 60 | 30 |
| 28 | 14 | 61 | 30, 31 |
| 29 | 14, 15 | 62 | 31 |
| 30 | 15 | 63 | 31, 32 |
| 31 | 15, 16 | 64 | 32 |
| 32 | 16 | | |

FIG. 31

| WHITE PIXEL NUMBER OF WINDOW G | WHITE PIXEL NUMBER OF WINDOW G BINARY CODE | CORRESPONDING WHITE PIXEL NUMBER OF WINDOW E | ADDRESS | DATA |
|---|---|---|---|---|
| 0  | 0000000 | 0  | 0000 | 00 |
| 1  | 1000000 | 1  | 0040 | 01 |
| 2  | 0000001 | 1  | 0001 | 01 |
| 3  | 1000001 | 2  | 0041 | 02 |
| 4  | 0000010 | 2  | 0002 | 02 |
| 5  | 1000010 | 3  | 0042 | 03 |
| 6  | 0000011 | 3  | 0003 | 03 |
| 7  | 1000011 | 4  | 0043 | 04 |
| 8  | 0000100 | 4  | 0004 | 04 |
| 9  | 1000100 | 5  | 0044 | 05 |
| 10 | 0000101 | 5  | 0005 | 05 |
| 11 | 1000101 | 6  | 0045 | 06 |
| 12 | 0000110 | 6  | 0006 | 06 |
| 13 | 1000110 | 7  | 0046 | 07 |
| 14 | 0000111 | 7  | 0007 | 07 |
| 15 | 1000111 | 8  | 0047 | 08 |
| 16 | 0001000 | 8  | 0008 | 08 |
| 17 | 1001000 | 9  | 0048 | 09 |
| 18 | 0001001 | 9  | 0009 | 09 |
| 19 | 1001001 | 10 | 0049 | 0A |
| 20 | 0001010 | 10 | 000A | 0A |
| 21 | 1001010 | 11 | 004A | 0B |
| 22 | 0001011 | 11 | 000B | 0B |
| 23 | 1001011 | 12 | 004B | 0C |
| 24 | 0001100 | 12 | 000C | 0C |
| 25 | 1001100 | 13 | 004C | 0D |
| 26 | 0001101 | 13 | 000D | 0D |
| 27 | 1001101 | 14 | 004D | 0E |
| 28 | 0001110 | 14 | 000E | 0E |
| 29 | 1001110 | 15 | 004E | 0F |
| 30 | 0001111 | 15 | 000F | 0F |
| 31 | 1001111 | 16 | 004F | 10 |
| 32 | 0010000 | 16 | 0010 | 10 |

$g_0$  $g_6$  $g_1$

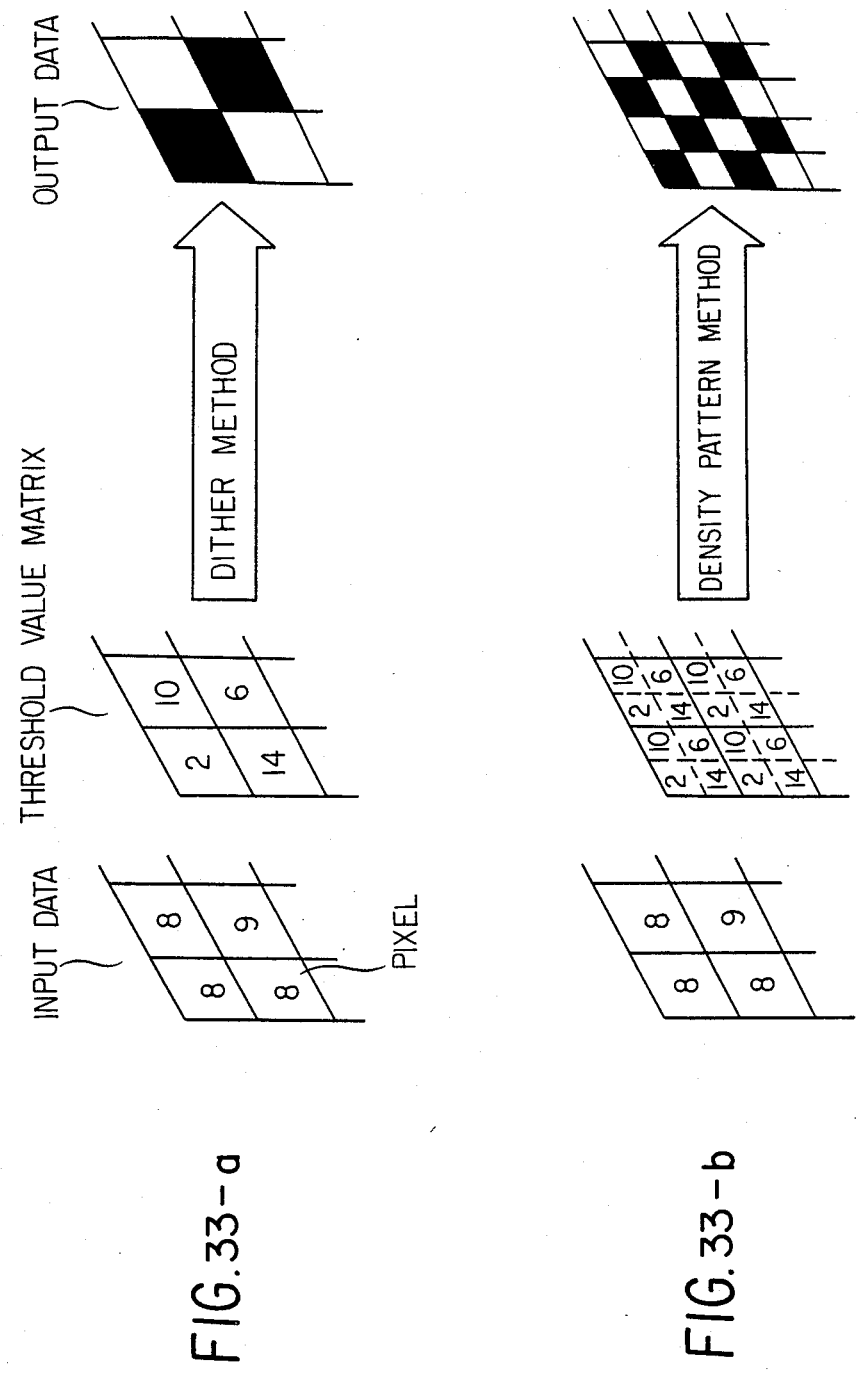
FIG.33-a
FIG.33-b

APPARATUS FOR PROCESSING HALFTONE IMAGE

This application is a continuation-in-part, of application Ser. No. 07/118,945, filed Nov. 10, 1987, now abandoned.

BACKGROUND OF THE INVENTION

The present invention relates to an apparatus for processing halftone image, which is applicable for estimating a halftone image from a binary coded image, for instance, the apparatus can satisfactorily estimate an original binary coded image based on a binary coded image expressed in halftone.

Most of output apparatuses currently subjected to practical use, such as display apparatus and printing apparatus, can express an image using two values of black and white.

As a method for obtaining a pseudo halftone image using these apparatuses, the density pattern method (brightness pattern method) or dither method are well-known.

The density pattern method and the dither method are one kind of the tone production method by density of each element, which obtains a halftone image by changing the number of dots recorded within a specific area (matrix).

The density pattern method records an area corresponding to one pixel of an original image with a plurality of dots using a threshold value matrix as shown in FIG. 33-b. The dither method records an area corresponding to one pixel of an original image with one dot using a threshold value matrix as shown in FIG. 33-a. Both methods can obtain binary coded output data, which express a pseudo halftone image of the original using two codes of black and white.

If the original halftone image (corresponding to the input data shown in FIG. 33) can be estimated from the pseudo halftone binary coded image thus-obtained, various types of data processings are enabled, thereby the degree of freedom in image transformation can be advantageously increased.

The density pattern image can be immediately returned to its original halftone image if the used pattern level configuration can be obtained. The resolution, however, is low for the information volume.

On the contrary, resolution of dither images is higher than that of density pattern images as compared with its information volume. However, it is difficult to return the dither image to its original halftone image. Therefore, various types of image transformation cannot be achieved using only the dither image.

Even when a multiple-coded image having three or more levels is used as an original image, the situation is the same as mentioned above.

SUMMARY OF THE INVENTION

Accordingly, it is an object of the present invention to provide an apparatus for processing a halftone image, which can overcome the above mentioned drawbacks and satisfactorily estimate a halftone image from an original image (for example, a binary coded dither image) without scaling up the required circuit.

The present invention also provides an image estimation method that can obtain halftone levels from binary coded character or line images in addition to the method that can estimate pseudo halftone images.

In order to solve the above mentioned problems, the present invention provides an apparatus for processing a halftone image, wherein a plurality of scanning windows, including a target pixel which halftone level is to be estimated, are set; the number of white or black pixels within the scanning window is counted per each of the plurality of scanning windows; binary coded image density pattern is obtained based on the computing result and the original image density pattern within the scanning windows are compared per each of the first group of scanning windows; whether or not the number of white or black pixels within each scanning window satisfies the predetermined conditional inequalities is examined per each of the second group of scanning windows; above plural judgements for each of the plurality of scanning windows are simultaneously carried out by either one of above two methods and then one scanning window is determined by comparing the plural judgment results with a predetermined condition; thus a halftone level of the target pixel is outputted based on the number of white or black pixels within the scanning window determined above.

The visual organ of human beings has the following characteristics: The gradation detection capability of pixel level is high in the low spatial frequency range (area of low pixel level change) and the gradation detection capability of pixel level is low in the high spatial frequency range (area of high pixel level change).

Therefore, if a high gradation image can be obtained in low spatial frequency area by using a larger scanning window, and a high resolution image of characters and lines can be reproduced in high spatial frequency area by using a smaller scanning window, a halftone image can be estimated more advantageously than by a conventional method.

In order to achieve the above object, a plurality of kinds of scanning windows are prepared, and for a low spatial frequency area, that is for an image such as a multilevel image, a scanning window larger than the reference scanning window is selected. At this time, the scanning window is selected based on whether or not a conditional equation that no density change is observed within the area to be detected is satisfied.

On the contrary, for a high spatial frequency area, that is for an image such as a line or character image, a scanning window smaller than the reference scanning window is selected. At this time, the scanning window is selected based on whether or not a conditional equation that no density change is observed within the area to be detected is satisfied.

Thus, by reproducing a halftone image on the basis of pixel level gradation detection ability of human beings, a halftone image similar to the original image can be obtained even if the original halftone image includes multilevel images, line images, and character images.

The present invention provides an image processing apparatus for the above image estimating method, wherein there are provided a plurality of line memories for introducing the original binary coded image data and for transferring the data into a shiftregister including a plurality of scanning windows varying in size for estimating a halftone level of a target pixel, a computing circuit for counting either one of white pixels or black pixels within each of the plurality of scanning windows, a pattern discriminating circuit for performing the comparison judgment whether or not the density pattern of rebinary coded image data obtained by coding the value counted in the computing circuit with a threshold matrix is coincident with the density pattern of the original binary circuit within respective scanning window, a conditional formula circuit having a conditional inequality circuit for performing a predetermined conditional algorithm based on the values counted in the computing circuit, and a window judgment circuit having a predetermined truth table for selecting one scanning window from among the plurality of scanning windows in response to judgment result signal outputted from the pattern discriminating circuit and the conditional formula circuit.

BRIEF DESCRIPTION OF THE DRAWINGS

FIG. 2 is an explanatory drawing showing steps for producing a dither image from an original halftone image;

FIG. 3 shows examples of scanning windows used;

FIG. 4 shows estimated values of a halftone image when respective scanning window is used;

FIG. 6 shows the positional relationship between the dither image and scanning window;

FIG. 7 is an explanatory drawings for estimation method of a halftone image;

FIG. 9 is an explanatory drawing similar to FIG. 7;

FIG. 12 shows an example of halftone image obtained by the method according to the present invention and a selection chart of windows used for obtaining the halftone image;

FIG. 13 is a truth table showing judgment condition used for obtaining the halftone image described above;

FIG. 23, shows the relationship between the clock signal, latch data, and operation mode of calculators;

FIG. 28-a is a block diagram showing density pattern discriminating circuit and a conditional inequality discriminating circuit;

FIG. 28-b is a block diagram showing one example of a density pattern descriminating circuit;

FIG. 28-c is an explanatory drawing for the change of a density pattern in accordance with the position information;

FIG. 30 is a table showing the relationship between the number of white pixels "g" and the number of white pixels "e";

FIG. 31 shows data stored in the conditional inequality ROM;

FIG. 33 is an explanatory drawing of binary coding methods.

DESCRIPTION OF THE PREFERRED EMBODIMENT

Figure 1:
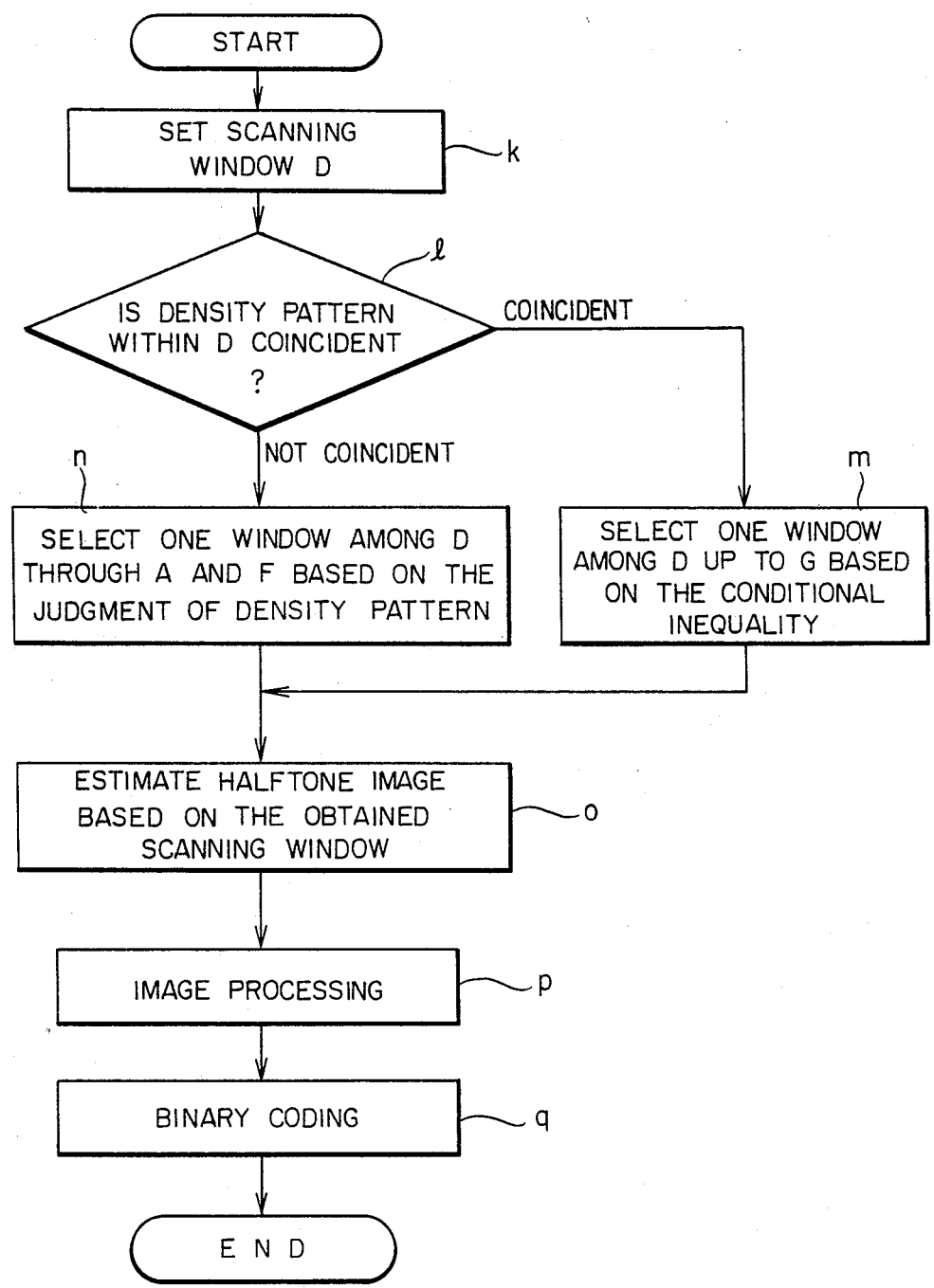
FIG. 1 is a flow chart showing the method for estimating halftone image according to the present invention.

Referring to FIG. 1 and the following, the basic method for estimating a halftone image of a binary coded image according to the present invention will be further detail. FIG. 1 is a flowchart showing an example of the method for estimating images, wherein a binary coded image is used as an original image. To facilitate easy description of the flowchart, the chart is sequentially explained referring to FIG. 2 and the following.

In the embodiments described below, a binary coded dither image is explained as a binary coded image. First, an example, in which a bayer type dither matrix of $8 \times 8$ is used as a threshold value matrix, will be explained as one of systematic binary coded dither methods.

Figure 2:
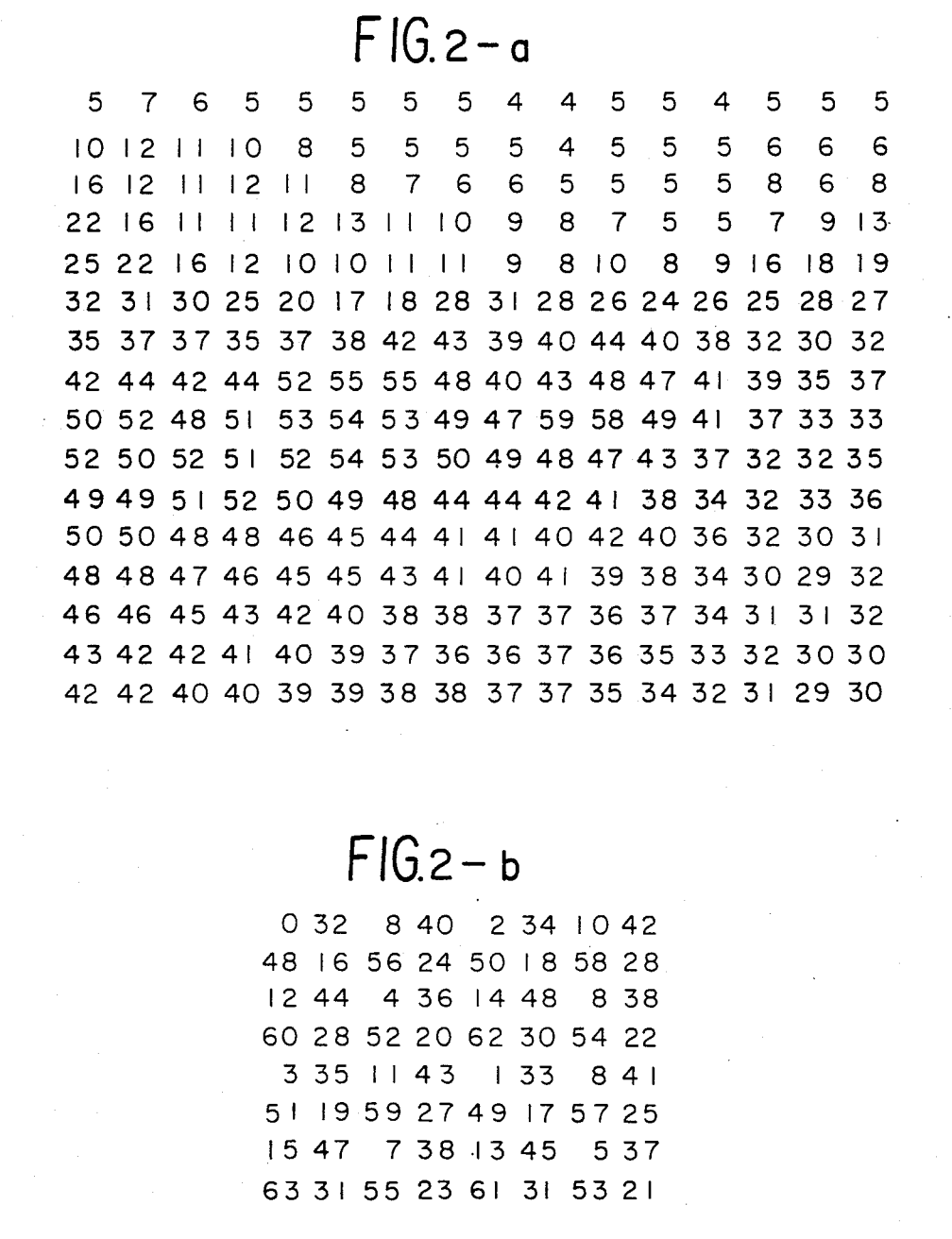

FIG. 2 is an example of binary coded dither image for explaining the present invention.

FIG. 2-a shows an original halftone image converted into digital data, FIG. 2-b is a threshold value matrix of $8 \times 8$ Bayer type, and FIG. 2-c is a binary coded dither image, which is produced by converting the original image (shown in FIG. 2-a) into binary codes of black and white using the threshold value matrix (shown in FIG. 2-b).

In the binary coded dither image shown in FIG. 2-c, pixels of white level are shown in white and pixels of black level are shown in black. In the following description, these pixels are expressed in the same manner.

The Bayer type threshold value matrix means a dither pattern in which threshold values disperse as shown in FIG. 2-b.

In order to scan the dither image shown in FIG. 2-c in the row and column directions, a plurality of scanning windows having different window area are prepared. Since a matrix of $8 \times 8$ is used in this embodiment, a maximum scanning window used is $8 \times 8$, which is designated as scanning window G as shown in FIG. 3.

Scanning windows F through A and Z are prepared so that each area of these windows is 178, ¼, ⅛, 1/16, or 1/64 of the area of the scanning window G, respectively.

The scanning window Z is of 1 row $\times$ 1 column; A, or 2 rows $\times$ 2 columns; B, of 2 rows $\times$ 4 columns; C, of 4 rows $\times$ 2 columns; D, of 4 rows $\times$ 4 columns; E, of 4 rows $\times$ 8 columns; and F, of 8 rows $\times$ 4 columns.

The black point shown in each scanning window of A through Z is the center when moving the window on the dither image shown in FIG. 2-c.

The values of halftone image are estimated by selecting an optimum scanning window from these scanning windows having different area.

Figure 4:
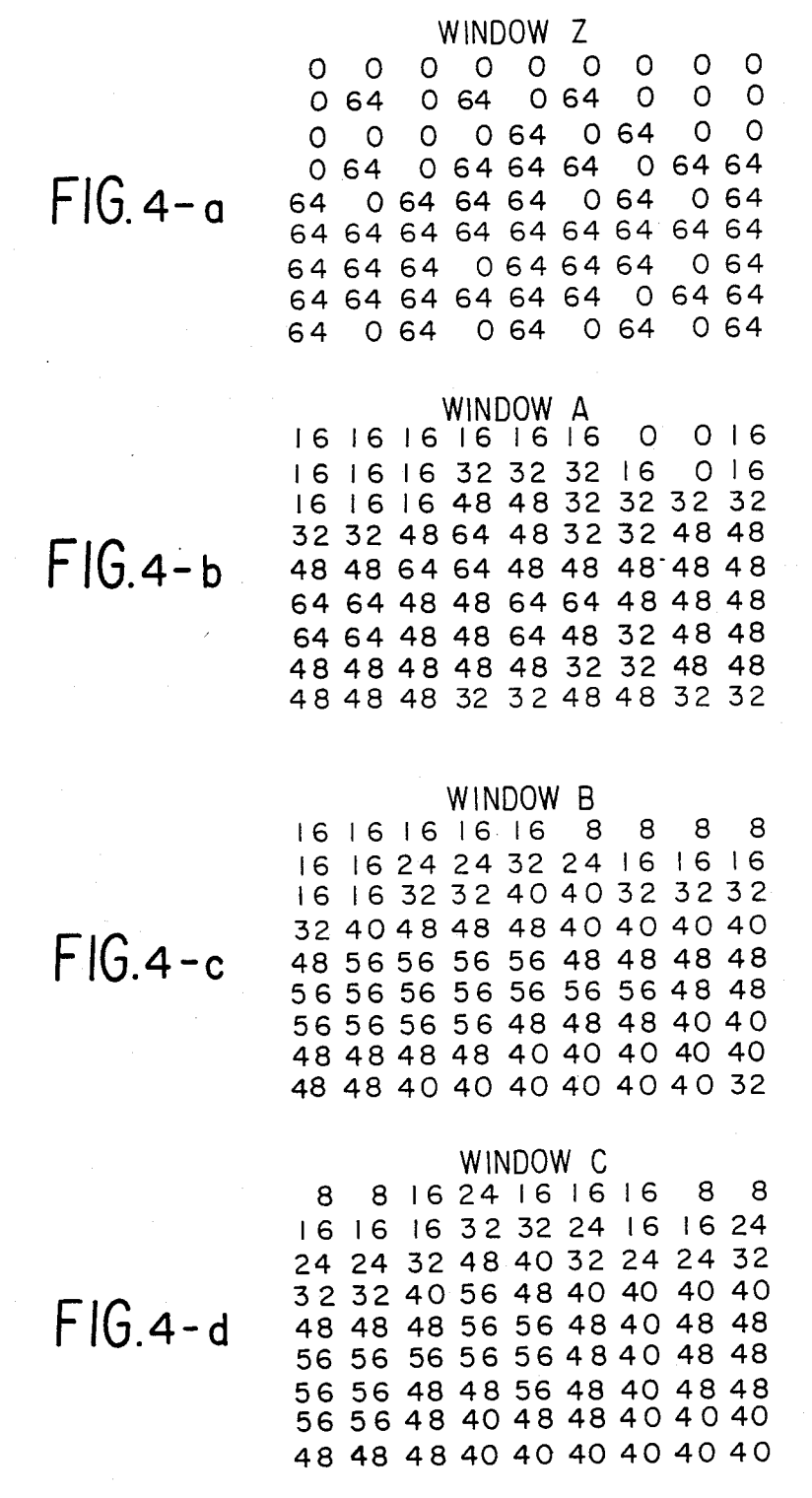

If a halftone image is obtained scanning a fixed window having a predetermined area, halftone images having the values shown in FIGS. 4-a through 4-h are obtained depending upon the used windows.

FIG. 4-a is a halftone image obtained by scanning the minimum window z, and FIGS. 4-b through 4-h are halftone images obtained by scanning windows A through G, respectively.

Figure 5:
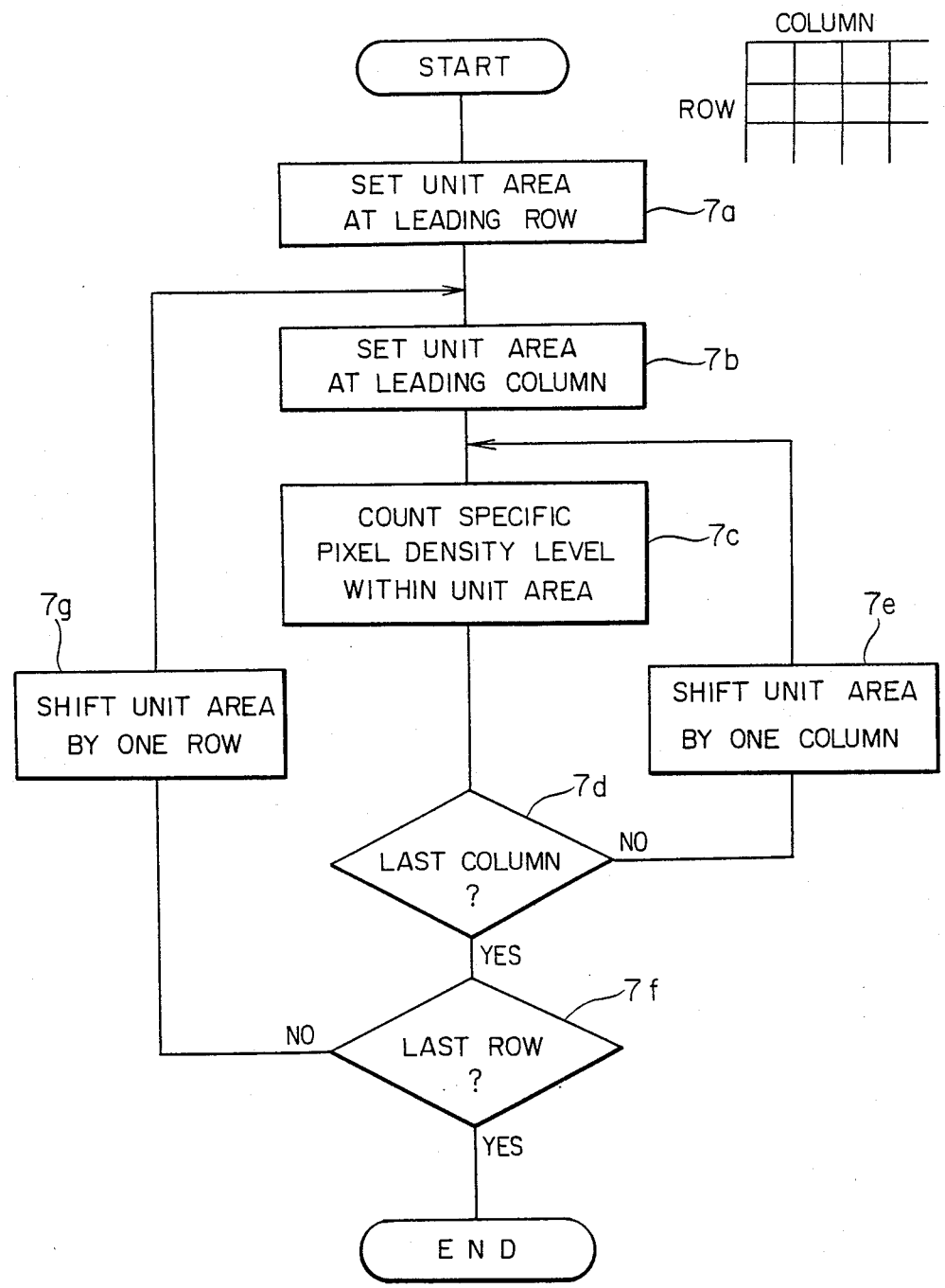
FIG. 5 is a flow chart showing a conventional operation for estimating a halftone image.

FIG. 5 shows the flow for estimating halftone images.

The estimating operation when the window D is used as a scanning window will be further described. First, the scanning window D is overlapped onto the initial position (leading column in the leading row) of the binary coded dither image (FIG. 2-c) as shown in FIG. 6 (steps 7a and 7b in FIG. 5).

In this case, it is preferable that the pixels included in the scanning window D are completely covered by the window. That is, it is preferable that there is no pixel which is partially covered by the window.

Next the pixel density level within the scanning window D is calculated and the obtained value is estimated as the estimation value of halftone image (step 7c). In this case, 3 is obtained. The area of the scanning window D equals ¼ of the area of the scanning window G. Therefore, the ratio of the area of the window D to the area of the maximum window G (hereinafter, the area ratio is referred to as "gain", and in this case, the gain is 4) is multiplied by 3, thereby obtaining 12 as a halftone image level of this pixel. Thus, the estimation value of halftone image in the 1st column of the 1st row (1, 1) is 12.

Next, it is detected whether or not the current column is the last column. If the column is not the last one, the program flow advances to step 7e and the scanning window D is shifted to the right by one column, that is, by one pixel, thus estimating the halftone image at the position of (1, 2). In this case, the binary coded image level within the scanning window D is counted and estimated in the same manner as mentioned above, thereby obtaining 3. Therefore, a value of halftone image of 12 is estimated in this case.

These estimation steps are sequentially executed regarding to all columns in the same row.

After completing the estimation step regarding the last column, that is, all columns in the leading row, it is detected whether or not the current row is the last row in step 7f. If the current row is not the last row, the starting position for scanning the window D is downwardly shifted by one row at step 7g. Then, the density estimation procedures of halftone image are sequentially executed from the pixel on the leading column (2, 1) in the same manner as mentioned above.

By executing such processing to the last column in the last row by sequentially shifting the scanning window D per each pixel of the binary coded dither image, estimation values of a halftone image are obtained, and the estimation operation is complete.

FIG. 4-e shows the halftone image estimated by the above mentioned method.

Since this method estimates the halftone image (refer to FIG. 4) from the binary coded dither image (FIG. 2-c) having information less than the original halftone image shown in FIG. 2-a, it is doubtful that the obtained halftone image shown in FIG. 4 completely coincides with the original halftone image.

This result is caused by the fact that the method estimates a halftone image irrespective of spatial frequency characteristics.

Therefore, the method according to the present invention attempts to select an optimum scanning window per every pixel and to estimate a halftone image using the scanning window selected above. A halftone image more faithful to the original halftone image can be estimated by this method.

The selection of the scanning windows is carried out as follows. That is, larger scanning windows are used in a of lower spatial frequencies to permit high gradation expression, and smaller scanning windows are used in a range of higher spatial frequencies, thereby enabling to obtain an image of high resolution. In this case, line images and character images correspond to images of higher spatial frequencies, and multilevel images correspond to images of lower spatial frequencies.

In the low spatial frequency range, the conditions that no changes are observed in density are obtained in accordance with predetermined conditional inequalities as a criterion for selecting an optimum window from the plurality of scanning windows. On the contrary, the criterion for selecting an optimum window in the high spatial frequency range is to detect the patterns to be coincidence or not.

Therefore, the method for estimating halftone images according to the present invention should use the flows as shown in FIG. 1.

The outline of the estimation procedures whose flowchart is shown in FIG. 1 will be described below.

First, a scanning window is set as a reference window. The scanning window D having an intermediate area is set in this embodiment (step k). Next, it is detected whether or not the density pattern within the window D is coincident with the original pattern (step l). The method for detecting whether or not the density patterns are coincident will be described below.

When the density patterns are coincident with each other, one scanning window is selected from among the scanning windows D through G based on a predetermined conditional inequality (step m). On the contrary, if the density patterns are not coincident with each other, the program flow advances to step n to select one window from among scanning windows C through A and Z based on the judgement of density pattern.

After completing selection of the window, the level of halftone image is estimated using the obtained scanning window (step o). after this step, image processing such as enlargement or reduction is executed based on the estimated level of halftone image. At the same time, the obtained image is binary coded, completing the estimation process of the halftone image (steps p and q).

The processing operation starting from step 1 will be described referring to FIG. 7.

First, the scanning window D having an intermediate area is selected from among a plurality of scanning windows.

When the scanning window D is overlapped onto the leading position shown in FIG. 2-c (refer to FIG. 6), a dither image is obtained within the window D as shown in FIG. 7-a. The number of white pixels within the scanning window D is counted, thus obtaining the number 3. Since the gain of the window D is 4, a value of 12 is obtained, as an average pixel level, by multiplying 3 by the gain. Thus, each pixel is assumed as 12 as shown in FIG. 7-b.

The image shown in FIG. 7-d is obtained by binary coding the average pixel level image shown in FIG. 7-b using the threshold value matrix shown in FIG. 7-c. The threshold value matrix shown in FIG. 7-c represents the positional information of the scanning window on the dither image.

The dither image shown in FIG. 7-a and the binary coded image shown in FIG. 7-d are compared, representing that both density patterns are coincident with each other.

Accordingly, an appropriate scanning window has been selected based on the conditional inequality as shown in steps l and m in FIG. 1.

Figures 8, 10:
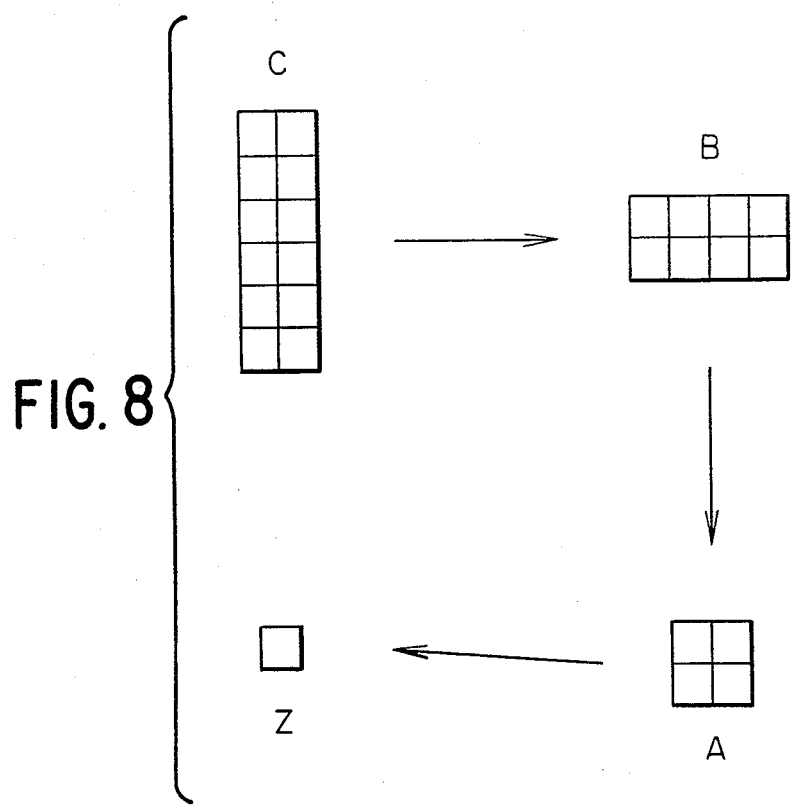
FIG. 8 shows the selection sequence of the scanning window.
FIG. 10 shows conditions for selecting scanning windows used in an apparatus according to the present invention.

If the density patterns are not coincident with each other and the program flow advances to step n, a scanning window as large as possible is selected provided that the density within the scanning window does not change. Therefore, the scanning window is selected in this order (C→B→A→Z) as shown in FIG. 8.

FIG. 9 is an explanatory drawing of a method according to the present invention.

FIG. 9 shows a case when the center of movement of the scanning window D is on (4, 6). If the center of scanning window D is positioned onto the center of movement (4, 6) of the dither image shown in FIG. 2-c, the result shown in FIG. 9 Process (1) is obtained.

The number of white pixels within the scanning window D is counted and 4 is obtained. Since the gain of the window D is 4, the number of white pixels within the window is multiplied by the gain, thereby 16 is obtained as an average pixel level. Thus, 16 is assigned to each pixel as shown in FIG. 9-1-b.

By binary coding the image, expressed by the values of average pixel level, using the threshold value matrix shown in FIG. 9-1-c, the image shown in FIG. 9-1-d is obtained.

At this point, the dither image shown in FIG. 9-1-a and the binary coded image shown in FIG. 9-1-d are compared. The density pattern of these images is not coincident with each other.

Accordingly, the program flow advances to Process (2). The sanning window C is selected in this step.

The number of white pixels within the scanning window C is counted to obtain 2. Since the gain of the window C is 8, the number of white pixels within the window is multiplied by the gain, thereby 16 is obtained as an average pixel level. Thus, 16 is assigned to each pixel as shown in FIG. 9-2-b.

By binary coding the image, expressed by the average pixel level, using the threshold value matrix shown in FIG. 9-2-c, the image shown in FIG. 9-2-d is obtained.

At this point, the dither image shown in FIG. 9-2-a and the binary coded image shown in FIG. 9-2-d are compared, thus indicating that the density pattern of these images is coincident with each other.

Accordingly, the scanning window C is selected as an optimum window. At this time, the estimated value of the halftone image is 16.

If the optimum scanning window is not selected by one selection operation, the following scanning window is used to continue the above mentioned selection procedure sequentially. If the obtained density pattern is not coincident with the original pattern even by using the scanning window A, the minimum window Z is selected and 64 or 0 is used as the estimated value of the halftone image. That is, the value (64 or 0) is obtained by multiplying the number of white pixel (1 or 0) by the gain (64) of the scanning window Z.

Next, the operation process of step m in FIG. 1 will be described below.

When the density pattern within the scanning window is coincident with the original pattern in step l, the program flow advances to step m and execute the step.

In step m, a scanning window is selected from among the scanning windows D through G in consideration of the pixel level gradation detection ability of human beings. As mentioned above, a large scanning window is used in the low spatial frequency range to obtain high gradation expression, and a small scanning window is selected in the high spatial frequency range in order to reproduce high resolution image.

The conditions used at this time mean that no change in pixel level is detected.

The total value of binary coded pixel levels within each scanning window d through G is assumed as D through g, respectively. The conditions that no change in pixel level is detected are defined as follows:

$$[2d-e] \leq 1 \quad (1)$$

$$[2D-f] \leq 1 \quad (2)$$

$$[2e-g] \leq 1 \quad (3)$$

$$[2f-g] \leq 1 \quad (4)$$

$$d=0 \text{ or } d=16 \quad (5)$$

When each conditional inequality is satisfied, O is given. When each conditional inequality is not satisfied, X is given. The scanning window to be used depending on the combination of conditions is defined as shown in FIG. 10. The * mark in the table expresses either O or X. For instance, if the conditional inequalities (1), (2), and (5) are not satisfied, the scanning window D is selected irrespective of the results of conditional inequalities (3) and (4).

If conditional inequality (5) is not satisfied, inequality (1) is satisfied, and inequality (2) is not satisfied, the scanning window E is selected.

If conditional inequality (1) is not satisfied, and inequality (2) is satisfied, the scanning window F is selected.

When all inequalities (1) through (4) are satisfied, the scanning window G is selected.

When the number of white pixels within the window D is 0 or 16, the scanning window D is selected irrespective of the results of inequalities (1) through (4).

When the center of each window is positioned at the right lower corner of (4, 4) on the binary coded dither image shown in FIG. 2-c under the above described conditions, an optimum scanning window will be selected as follows. In this case, the number of white pixels within each window is:

$$d=3, e=9, f=8, g=21.$$

First, the results of conditional inequalities (1) and (2) are obtained.

$$|2d-e| = |6-9| = 3$$

Therefore, conditional inequality (1) is not satisfied.

$$|2d-f| = |6-8| = 2$$

Therefore, conditional inequality (2) is also not satisfied. Therefore, the optimum scanning window obtained is D according to FIG. 10.

The above mentioned conditional inequalities are only examples. Conditional inequalities other than the above mentioned ones may be used provided that the conditional inequalities can express conditions that no changes are detected in pixel level.

Next, the value for expressing the pixel at the leading column in the leading row of the halftone image is estimated when the scanning window D is selected. Since the total value of binary coded pixel level at the leading position is d=3 when the scanning window D is selected, and the gain of scanning window D is 4, the estimated value of halftone image is:

$$3 \times 4 = 12$$

These estimation procedures are executed per each target pixel, thus one of the scanning windows A through Z is selected per every estimation step. Therefore, the entire flow for selecting one of the scanning windows A through Z is summarized in FIG. 11, thereby only one and optimum scanning window is selected.

FIG. 12-a shows an estimated halftone image and FIG. 12-b shows each scanning window used for estimating the image.

Regarding to the estimation procedures for the halftone image on the leading row, the following windows are used: D for (1, 1); D for (1, 2); C for (1, 3); B for (1, 4); C for (1, 5); B for (1, 6); B for (1, 7).

Figure 11:
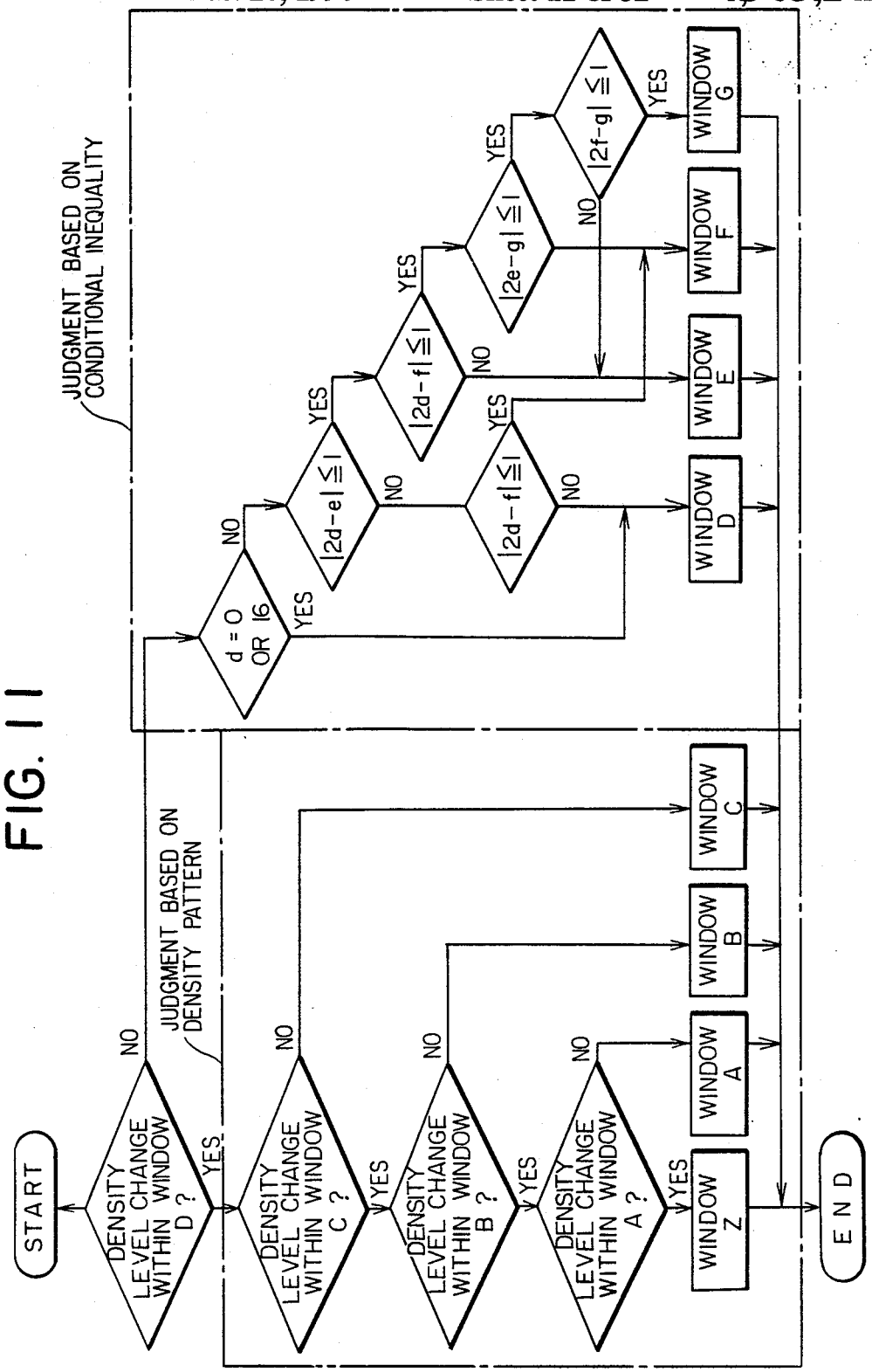
FIG. 11 is a flowchart showing an example of procedure for selecting a scanning window used in an apparatus according to the present invention.

If a hardware is constructed according to the program flow shown in FIG. 11, it is difficult to realize a high speed image processor. Therefore, an example will be described below for constructing an apparatus using relatively simple logic circuits, which can process the above mentioned program flow. In order to embody the apparatus, a table of truth values of each judgement should be produced based on FIG. 11. The obtained results are shown in FIG. 13.

The logical formula for selecting a scanning window using the table of truth values are as follows:

Window $Z = \overline{AP} \cdot \overline{BP} \cdot \overline{CP} \cdot \overline{DP}$
Window $A = AP \cdot \overline{BP} \cdot \overline{CP} \cdot \overline{DP}$
Window $B = BP \cdot \overline{CP} \cdot \overline{DP}$
Window $C = CP \cdot \overline{DP}$
Window $D = DP \cdot DW + DP \cdot \overline{DW} \cdot \overline{S1} \cdot \overline{S2}$
Window $E = DP \cdot \overline{DW} \cdot S1 \cdot \overline{S2} + DP \cdot \overline{DW} \cdot S1 \cdot S2 \cdot S3 \cdot \overline{S4}$
Window $F = DP \cdot \overline{DW} \cdot S1 \cdot S2 + DP \cdot \overline{DW} \cdot S1 \cdot S2 \cdot \overline{S3}$
Window $G = DP \cdot \overline{DW} \cdot S1 \cdot S2 \cdot S3 \cdot S4$ It will be easily understood that only one scanning window can be selected by executing the above mentioned logical formula using judgement means with the plural judgement results obtained by simultaneously performing both the density pattern judgement for the first group of scanning windows (D, B, C, A and Z) and the conditional inequality judgement for the second group of scanning windows (D, E, F and G).

Where;
AP means that the judgement result concerning the pattern within the scanning window A is satisfied;
DW means that the number of white pixels within the scanning window d satisfies the equation (5);
S1 means that the conditional inequality (1) is satisfied; and
the indication of — means that the conditional inequality is not satisfied.

Each scanning window selected can be easily discriminated by designating using symbol of three bits as follows:

Z (0 0 0), A (0 0 1), B (0 1 0), C (0 1 1), D (1 0 0), E (1 0 1), F (1 1 0), G (1 1 1)

The estimated halftone values can be obtained by multiplying the number of white pixels within the selected window by the gain symbolized as shown above.

Figure 14:
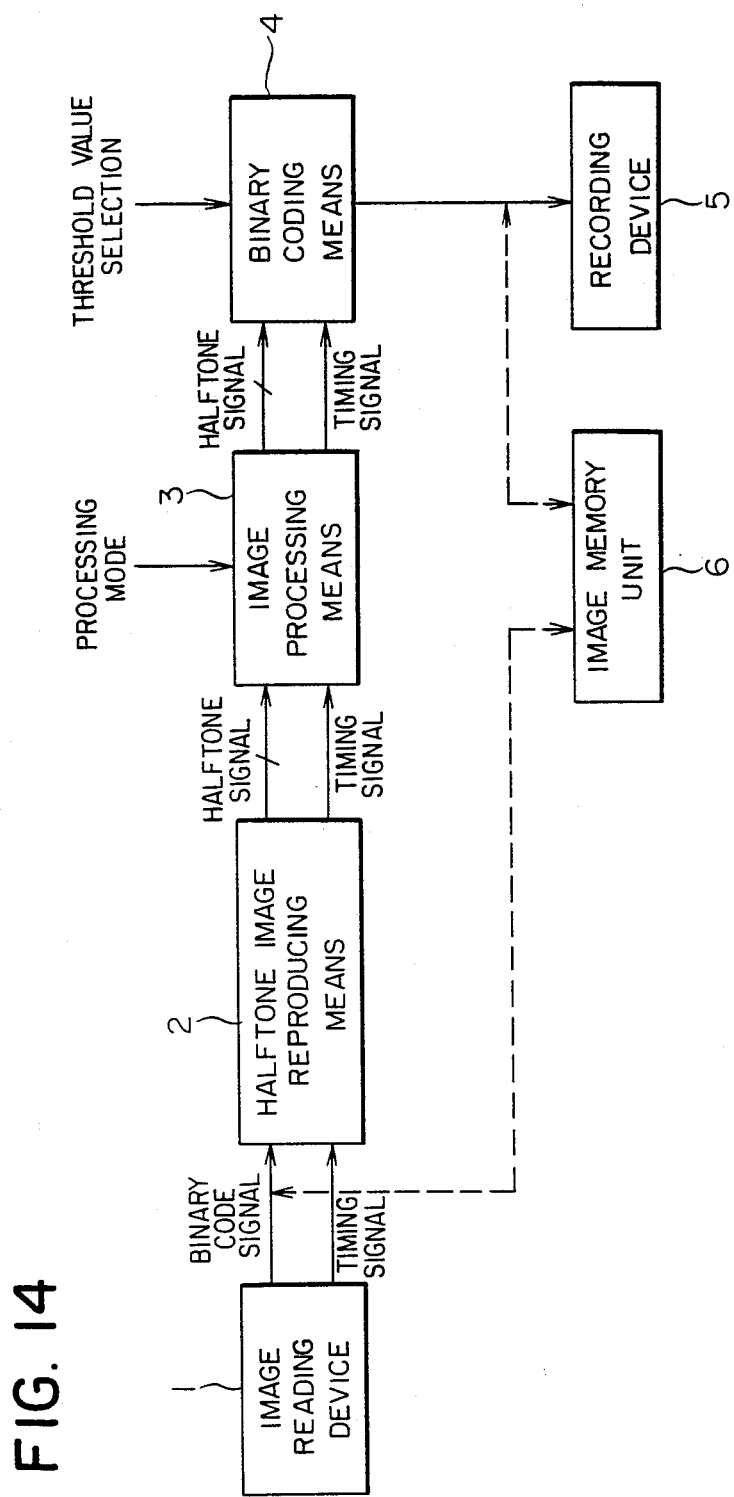
FIG. 14 is a block diagram outlining an apparatus for estimating a halftone image.

In the above disclosure, the processing procedures for estimating images according to the present invention has been described by referring FIGS. 1 through 13. In FIG. 14. and following figures, embodiments of the apparatus are described when the apparatus are constructed in order to realize the above mentioned method.

FIG. 14 shows the outline configuration of the apparatus for estimating halftone images, wherein the components are shown in the order of signal flow. An image reading device 1 reads a draft image and converts the image into binary coded data.

The draft image is read using photoelectric transfer devices such as a CCD and converted into electric signals. The converted electric signals are further converted into digital data from analog data. The digital data is subjected to the shading compensation (to evenly compensate CCD output), followed by a series of data processing, thereby obtaining binary coded data.

The digitized binary coded data transferred from the image reading device are supplied to a halftone image reproducing means 2.

Timing signals are supplied as well as the binary coded signals into the halftone image reproducing means 2, thereby halftone image signals are reproduced from the binary coded signals.

The halftone image signals are transferred into an image processing means 3 along with the timing signals, thus being subjected to the image processing operation such as enlargement, reduction, or filtering corresponding to a predetermined processing mode.

The processed halftone image signals are transferred into a binary coding means 4 and subjected to the re-binary-coding process using the threshold values selected by the threshold value selecting signals. The threshold value selecting signals are entered from a control terminal or keyboard.

The numeral 5 represents a recording device, which reproduces an image based on the binary coded data outputted from the binary coding means 4 or an image memory unit 6.

As the recording device 5, a laser printer or an LED printer may be used. The image memory unit 6 is constructed so that the unit can also memorize the binary coded data transferred directly from the image reading device 1.

Figure 15:
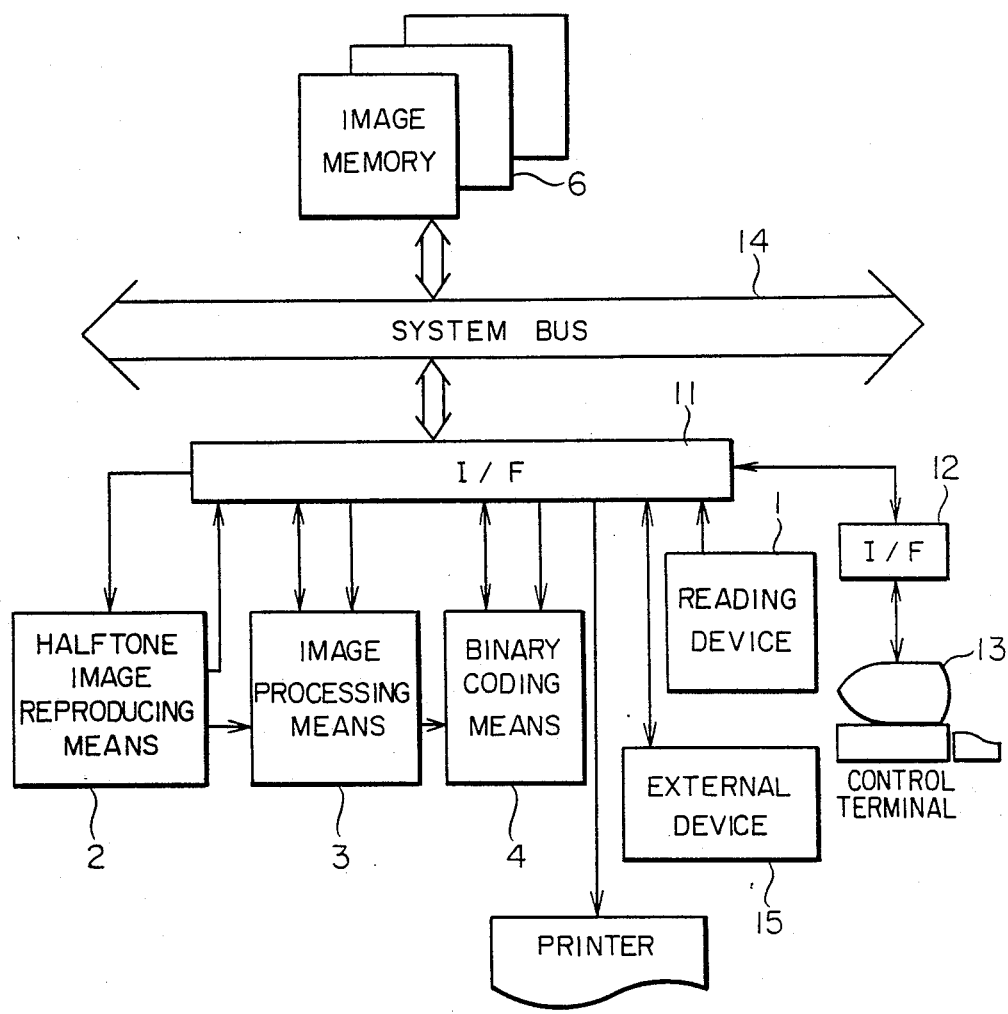
FIG. 15 is a block diagram showing an apparatus for estimating a halftone image.

FIG. 15 shows an example of image processing system constructed based on FIG. 14.

The image reading means 1, halftone image reproducing means 2, image processing means 3, binary coding means 4, and recording device 5 are connected to a control terminal 13 via a first interface 11 and a second interface 12. The image memory unit 6 is connected to the first interface 11 via a system bus 14. The numeral 15 represents an external device.

Consequently, configuration of each unit will be described in detail.

Figure 16:
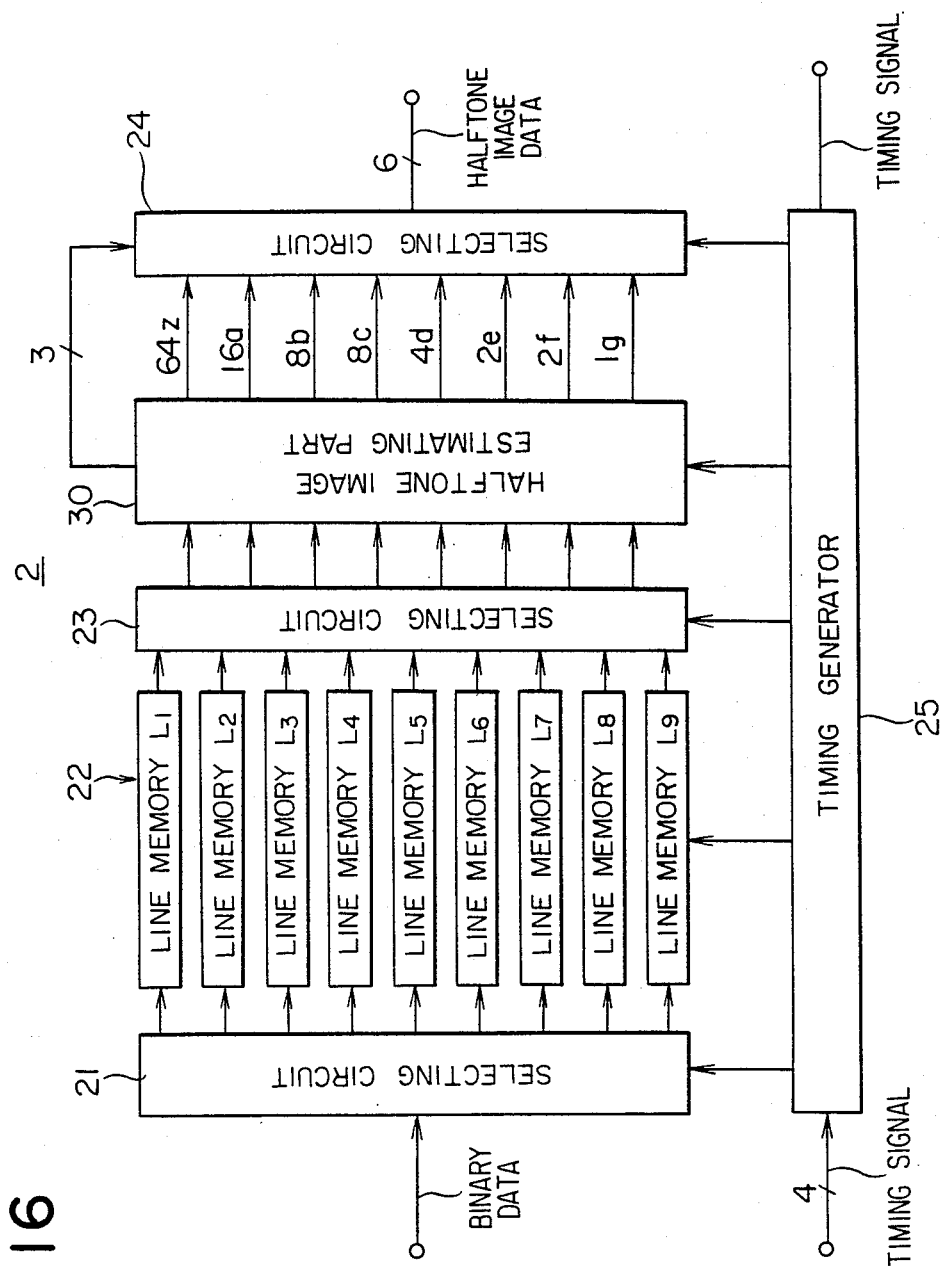
FIG. 16 is a block diagram showing an apparatus for reproducing a halftone image.

The image signals, namely binary coded signals, read by the image reading device 1 are transferred into the halftone image reproducing means 2. A halftone image having a predetermined halftone level is reproduced from the binary coded signals. FIG. 16 shows an example of the halftone image reproducing means 2.

The binary coded data are transferred from the image reading device 1 into a line memory unit 22 via a first selecting circuit 21.

The line memory unit 22 receives binary coded data transferred from the first selecting circuit 21, and memorizes binary coded data per each line. The line memory unit comprises nine line memories from L1 through L9 as shown in FIG. 16. Binary coded data corresponding to each line of the nine line memories from L1 through L9 are sequentially selected and stored in the selecting circuit 21.

The reason why nine line memories are provided is that the number of rows of the maximum scanning window G is 8, and an additional one line memory is required for executing real time processing.

Therefore, eight line memories of nine memories, which are required for current image processing, are selected in a second selecting circuit 23.

The binary coded data in each of the selected eight line memories are transferred into a halftone image estimating part 30. Only one scanning window is selected of a plurality of scanning windows based on the binary coded data.

The data indicating the selected scanning window are transferred into a selecting circuit 24, and then halftone image values defined by the pixel level within the selected scanning window and the gain of the window are estimated.

Various types of timing signals generated in a timing generator 25 are transferred into the line memory unit 22, halftone image estimating part 30 and selecting circuit 24 as well as into the first and second selecting circuits 21 and 23, thereby controlling data selecting and address transferring operations at predetermined timing.

Therefore, the synchronizing clock and horizontal valid period (H-VALID) and vertical valid period (V-VALID) signals are transferred into the timing generator 25 from the image reading device 1. The above mentioned timing signals are generated based on these transferred signals.

Figure 17:
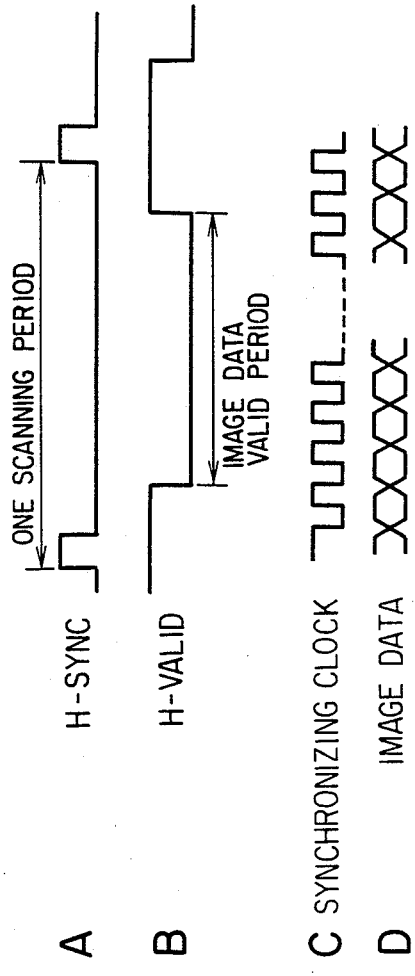
FIGS. 17 and 18 are timing charts for explaining image reading operation.

FIG. 17 shows the relationship between the horizontal synchronizing signal (H-SYNC), horizontal valid period signal (H-VALID), synchronizing clock, and image data. That is, the image data are read in synchronizing with the synchronizing clock within the image data valid period of the H-VALID signal.

Figure 18:
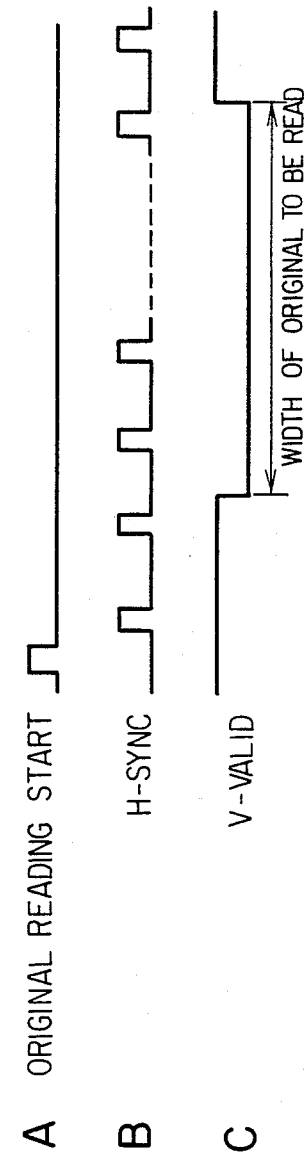

FIG. 18 shows the relationship between the original reading start, H-VALID, and V-VALID signals. As shown in this figure, after starting the original reading start signal and an elapse of a predetermined period of time, reading of image data begins. The width of original reading is decided depending upon the maximum size of the applicable original.

The halftone image estimating part 30 is provided in order to execute the following process. That is, the halftone image estimating part 30 sets a plurality of scanning windows including a target pixel to be estimated of its halftone level, counts the number of white or black pixels within each of the plurality of scanning windows, and perform with respect to the first group of scanning windows the comparison of density pattern between a binary coded image, which is produces based on the result of computing the number of white or black pixels within the respective scanning window, and the original binary coded image within the respective scanning window, thus detecting the comparison result.

With respect to the second group of scanning windows, the halftone image estimating part 30 performs the conditional inequality judgement as to whether or not the conditional inequality (1) to (5) are satisfied with the results of comuting the number of white of black pixels within the respective scanning window.

That is, the halftone image estimating part 30 is a means for determining a scanning window which satisfies a specific condition as shown in FIG. 13.

Figure 19:
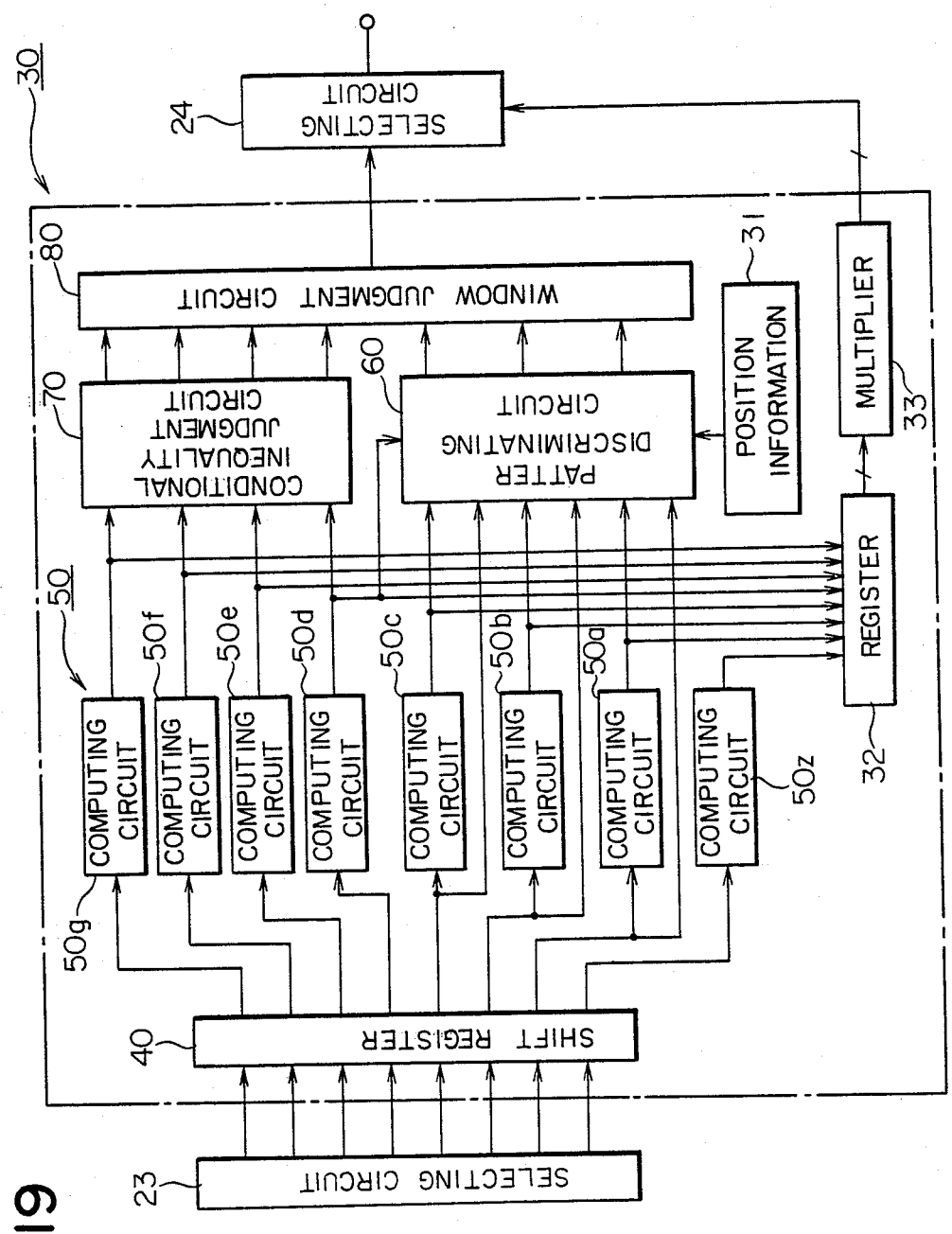
FIG. 19 is a block diagram showing an example of halftone image estimation apparatus.

To achieve the above mentioned object, the halftone image estimating part 30 comprises a plurality of means as shown in FIG. 19. This is, 1. A means 40 for setting a plurality of scanning windows:
2. A means 50 for setting each scanning window for a target pixel to be estimated its halftone image level and for computing the number of white or black pixels within the scanning window;
3. Means 60 and 80, which have a means for producing a binary coded image based on the number of white or black pixels counted per each scanning window, and compare, per each scanning window, the original binary coded image within the scanning window and the binary coded image produced above concerning its density pattern.
4. Means 70 and 80 for detecting whether or not the number of white or black pixels counted per each scanning window satisfies a predetermined condition.

In FIG. 19, the means 40 comprises a shift register; the means 60 is constructed as a density pattern discriminating circuit; the means 70 is constructed as a conditional inequality judgement circuit for judging change in density using the conditional inequalities. Thus, only one scanning window is selected at the window judgement circuit 80 using the outputs from the density pattern discriminating circuit 60 and the conditional inequality judgement circuit 70.

The numeral 31 represents a circuit for outputting position information of the pattern. A means 50 is constructed, in this configuration, for computing the number of white pixels, however, the means may be constructed so that it counts the number of black pixels.

The numeral 32 represents a register for storing the number of white pixels counted. The output from the register 32 is transferred into the multiplier 33 and each counted number of white pixels is multiplied by the gain of each scanning window, thus the obtained result is used as an estimated value of halftone image.

Therefore, data representing the estimated values of halftone image are transferred into the selecting circuit 24 and halftone image estimation value is selected based on the scanning window selection signals outputted from the window judgement circuit 80. For instance, if the scanning window D has been selected, a halftone image estimation value (=4d) is selected as follows; by multiplying the number (d) of white pixels within the scanning window by the gain (=4).

Examples of these means will be further described below.

Figure 20:
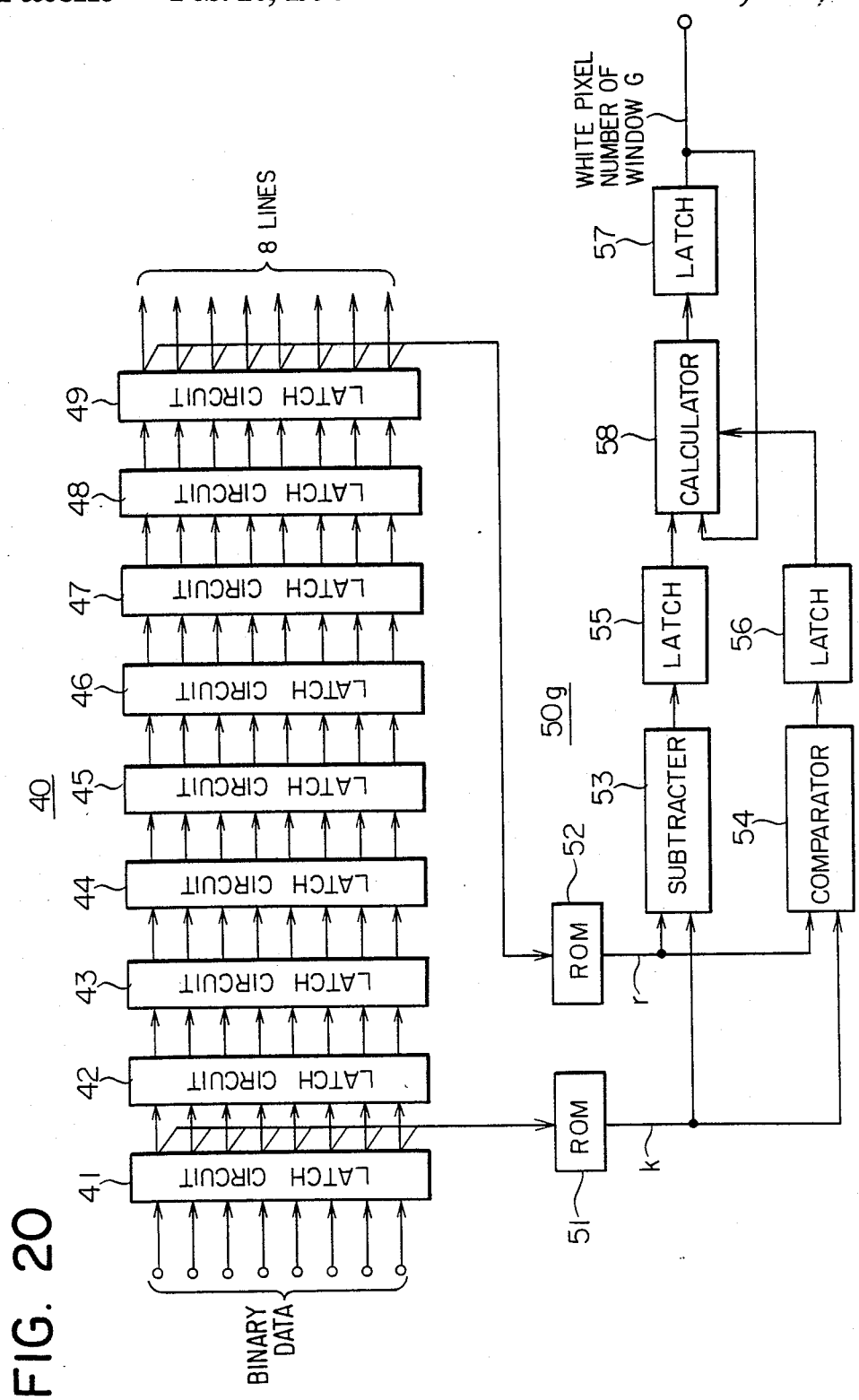
FIG. 20 is a block diagram showing an example of circuit for computing the number of white pixels.

The shift register 40 comprises eight-input latch circuits, nine of which are connected in series as shown in FIG. 20. The reason why nine latch circuits are used is that the shift register 40 is used, in common, for all of the circuits for computing the number of white pixels.

The number of white pixels is counted using an output from the latch circuit located at a required position.

The figure represents an example of a computing circuit 50g corresponding to the scanning window G. Since the scanning window G has an area of 8 rows×8 columns, each latch output from the first and final latch circuits 41 and 49 are used in order to count the number of all white pixels within the scanning window as shown in FIG. 20.

Therefore, latch outputs from the first latch circuit 41 are transferred into a first computing ROM 51 and latch outputs from the final latch circuit 49 are transferred into a second computing ROM 52, thereby the number of white pixels in the binary coded data latched in the respective latch circuit is counted.

Each computing output r or k is transferred into a subtracter 53 to execute subtraction of (k−r) and a subtraction output is obtained as follows:

If k>r, "0";
If k<r, "1."

The computing outputs k and r are also transferred into a comparator 54 and are compared with each other, and a comparison output is obtained as follows:

If k>r, "0";
If k<r, "1."

The subtraction and comparison outputs are transferred into and latched at the first and second latch circuits 55 and 56, respectively. At the same time, the output from the latch circuit 55 is transferred into the calculator 58 along with the output from a third latch circuit 57. The latch output from the second latch circuit 56 is transferred into the calculator as a control signal. In this example, the signal controls as follows:

When k>r, subtraction operation is executed.
When k<r, addition operation is executed.

The latch output from the third latch circuit 57 provided at the final stage of the register is outputted as data representing the number of white pixels within the scanning window G.

Next, the computing operation will be further explained with reference to FIGS. 21 and 22.

Figure 21:
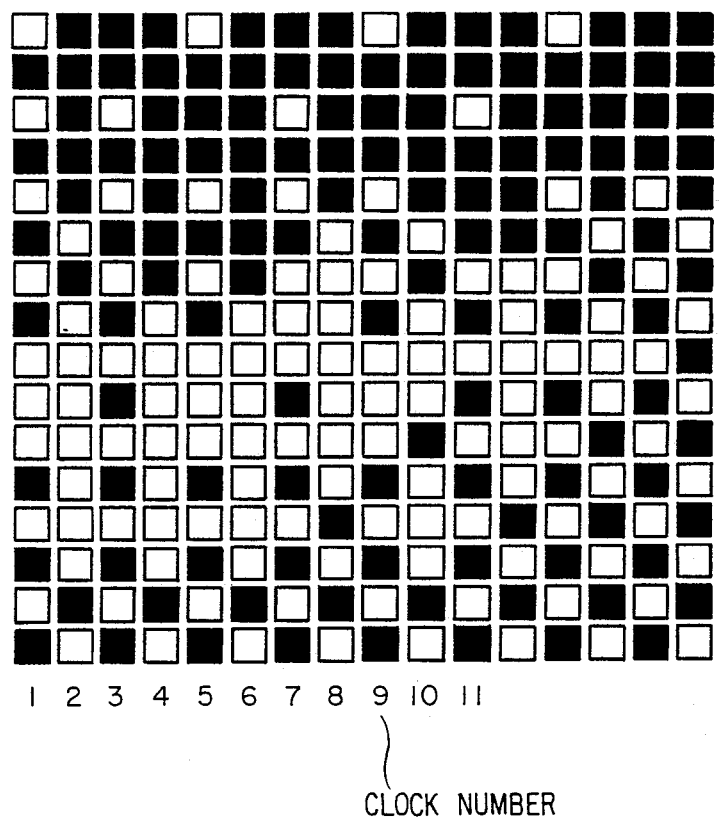
FIG. 21 is a dither image used for explaining the above mentioned operation.
Figure 22:
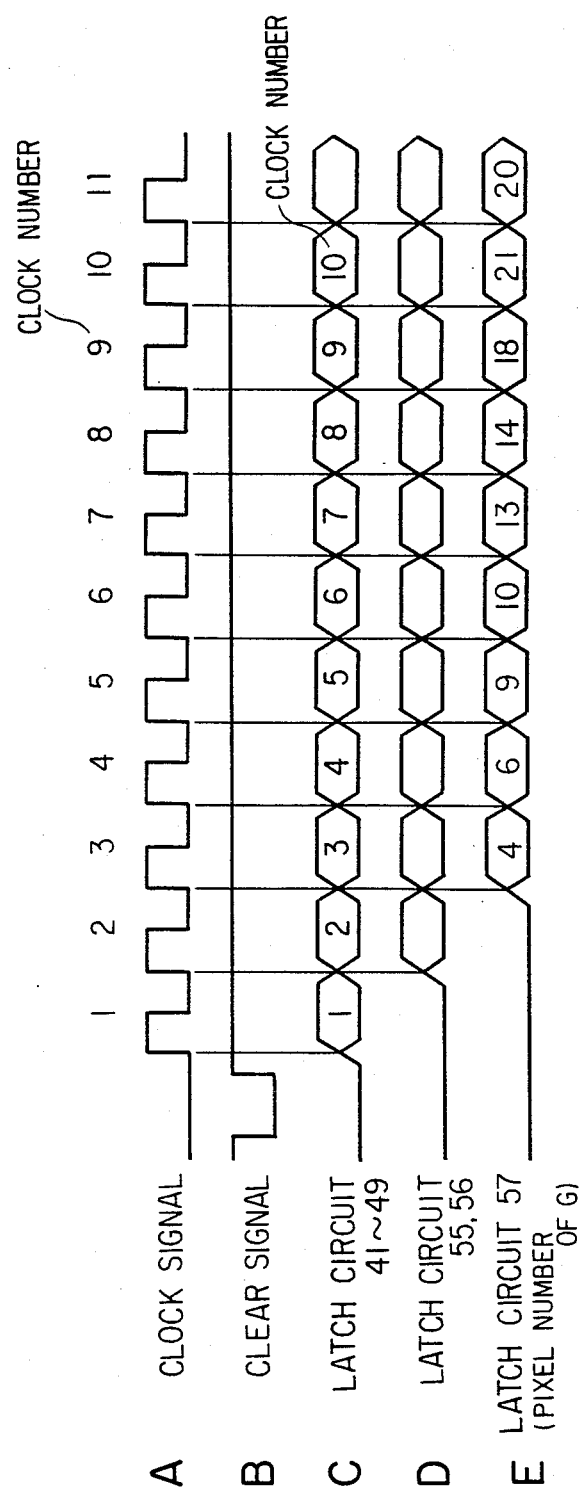
FIG. 22 is a timing chart used in the above mentioned operation.

The dither image shown in FIG. 21 (which is the same as that shown in FIG. 2-c) is used as an example. The latch circuits 41 through 49 for the shift register are set to zero. The setting signal is designated as clear signal (FIG. 22 A and B). All latch circuits 41 through 49 and 55 through 57 are set to zero by the clear signal remaining at the low level or falling to the low level (FIG. 22 C and D). After setting, the clear signal rises to the high level and the binary coded data, synchronizing with the clock signal (FIG. 22 A), are transferred into the first latch circuit 41 and latched at the circuit. The data latched in the first latch circuit 41 and in the 9th latch circuit 49 are inputted into the first computing ROM 51 and the second computing ROM 52, respectively.

Both computing ROMs 51 and 52 convert the binary coded image data into the numerical information of the number of white pixels. As shown in FIG. 21, numerical data of k=4 are outputted from the first computing ROM 51. The numerical data r outputted from the second computing ROM 52 equals zero.

Therefore, the numerical data of (k−r) are latched at the latch circuit 55. Since (k−r)>0, a "1" (high level) is latched at the latch circuit 56.

Since the output from the latch circuit 56 equals "1", the calculator 58 operates as an adder. Therefore, each latch output from the latch circuits 55 and 57 are added when a second clock signal is entered. In the above described example, since k=4, and r=0, the added output x equals 4.

As shown in FIG. 21, the total value of the numbers of white pixels of the binary coded data in the leading row equals 4, thus being coincident with the calculated numerical data.

The binary coded data in the second row of the dither image shown in FIG. 21 are entered at the timing when the second clock signal is given, thus obtaining k=2 and r=0. As a result, the calculator 58 executes the operation of $$(k-r)+x$$

when the third clock signal is entered. Since X=4, the newly calculated x equals 6.

By repeating these operations, the number of white pixels with in the scanning window G is calculated. FIG. 23 shows the latch outputs k, r, and x at each clock timing and the operation mode of the calculator 58.

As clearly understood from this table, all binary coded data from the first column to the 8th column have been latched at the 9th clock, and then the total value of the numbers of white pixels within the scanning window G are obtained at the 10th clock. In the case shown in FIG. 21, x=21 is obtained. At the 11th clock, the number of white pixels within the scanning window G is calculated when the window moves to the position in the second column of the first row. In the case shown above, x=20 is obtained.

As computing circuits 50e and 50f for the scanning windows E and F, circuits having the same configuration as that of the computing circuit g are used because the number of rows or columns equals 8.

Figure 24:
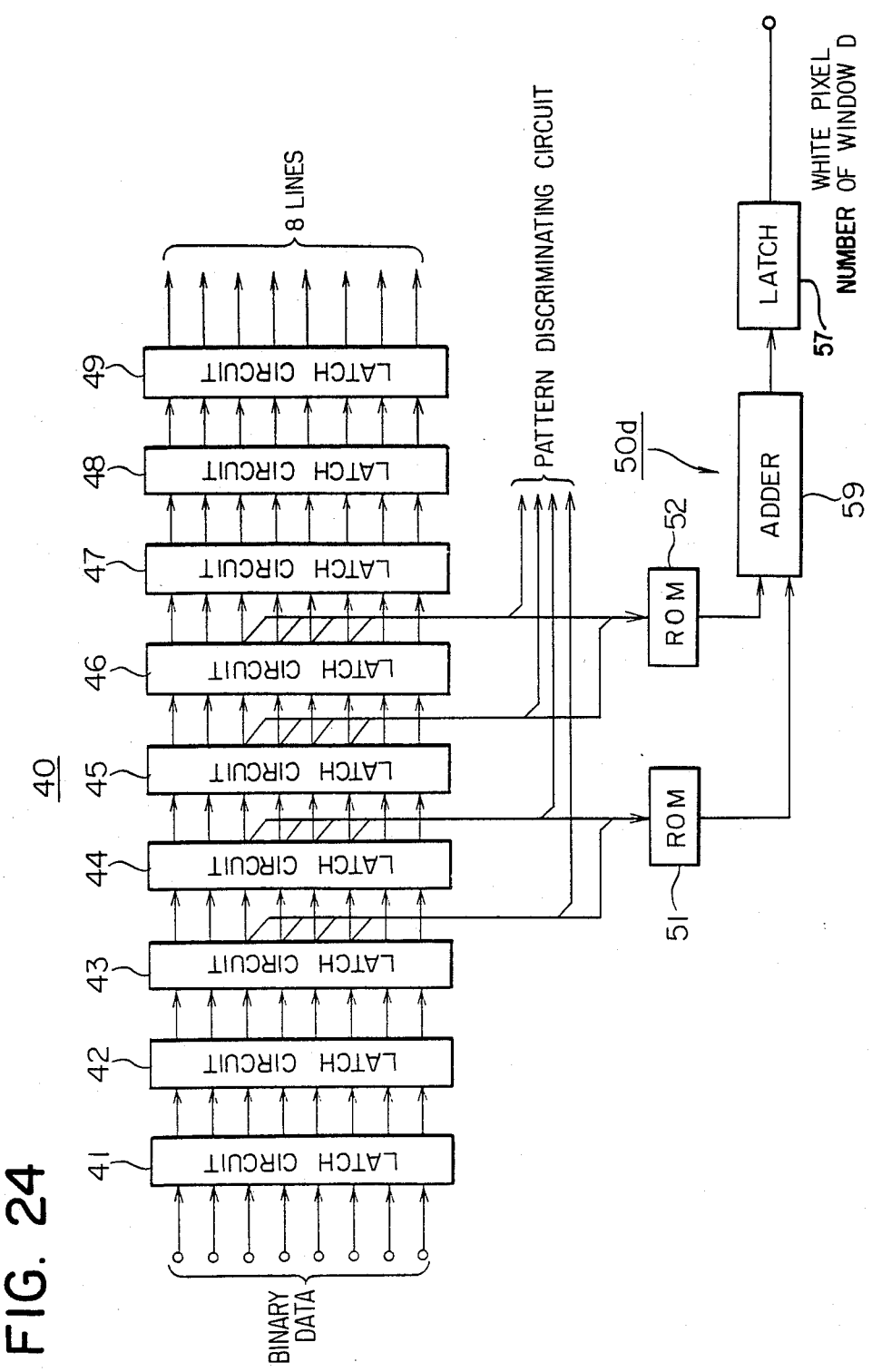
FIGS. 24 through 27 are block diagrams showing examples of circuits for computing the number of white pixels.

On the contrary, a circuit having the configuration shown in FIG. 24 is used as a computing circuit 50d for the scanning window D. That is, the circuit comprises a pair of computing ROMs 51 and 52, an adder 59, which directly calculates the outputs from the ROMs, and a latch circuit 57, which latches the output data from the adder. The reason why this configuration can be applied is that the total of binary coded data of two columns can be calculated by only one computing ROM, thus the subtracter 53 and latch circuits 55 and 56 can be eliminated.

In this case, latch circuits from the third circuit 43 through the 6th circuit 46, into which binary coded data of the third row through the 6th row are stored, are used.

Figure 25:
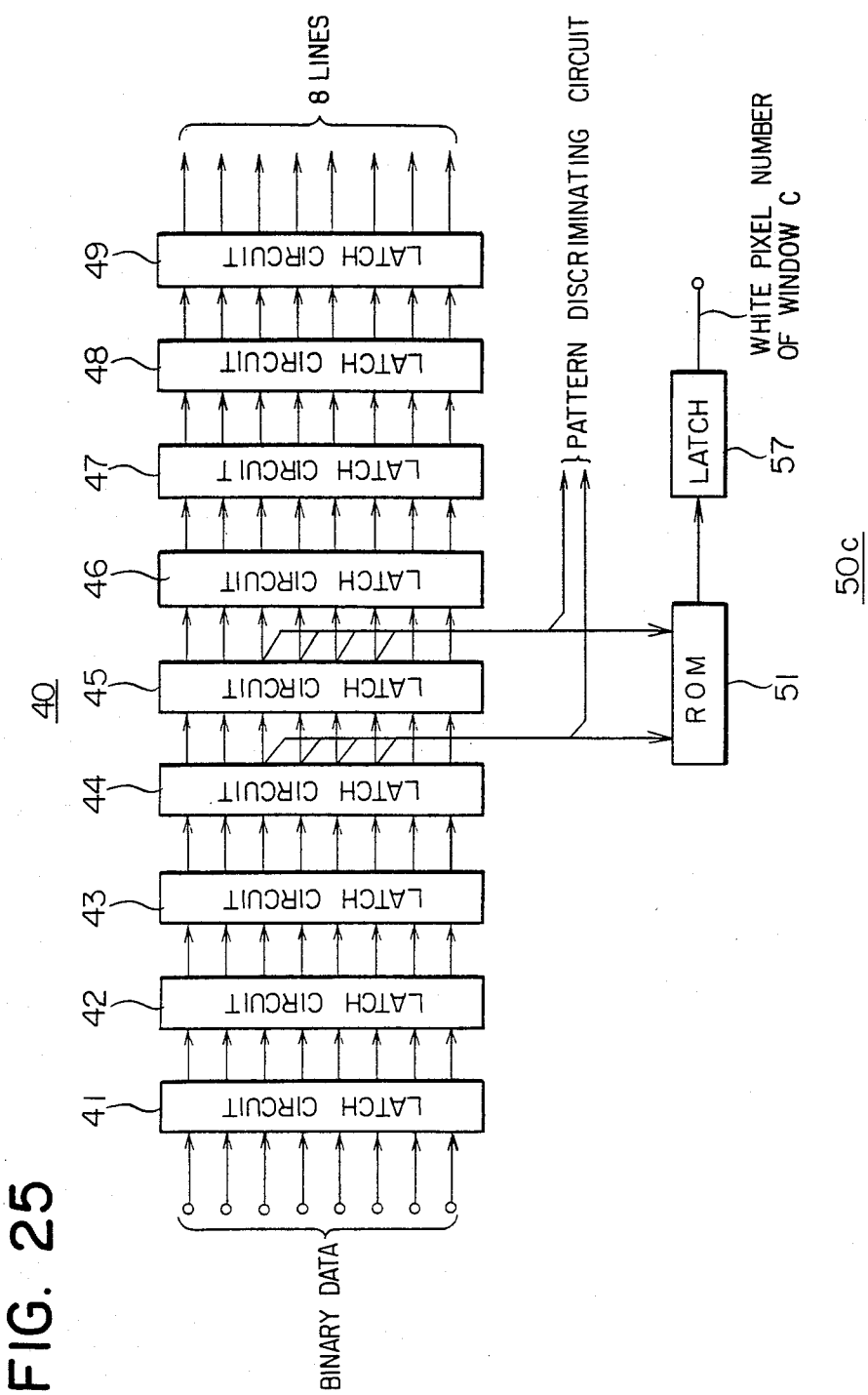
Figure 26:
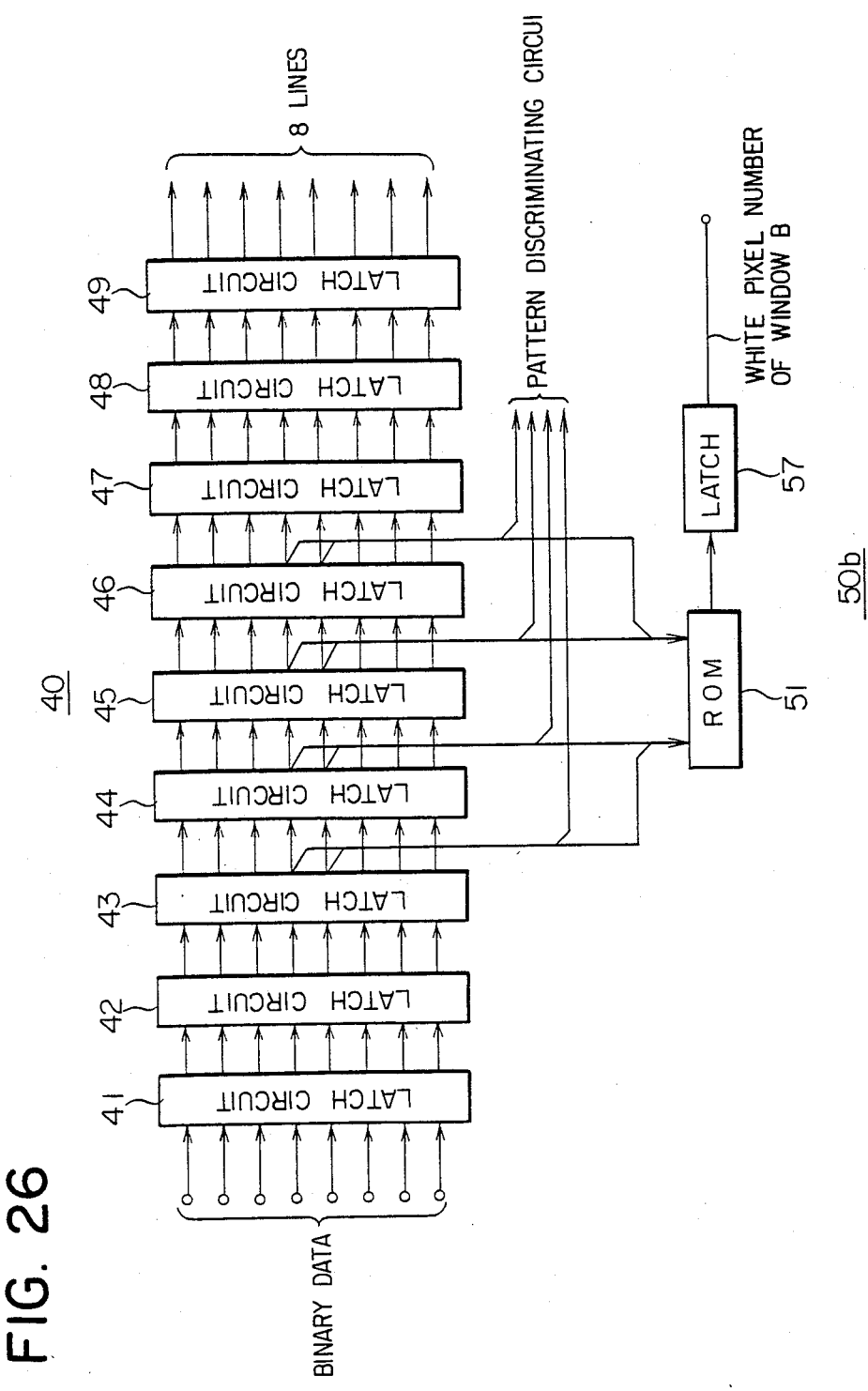
Figure 27:
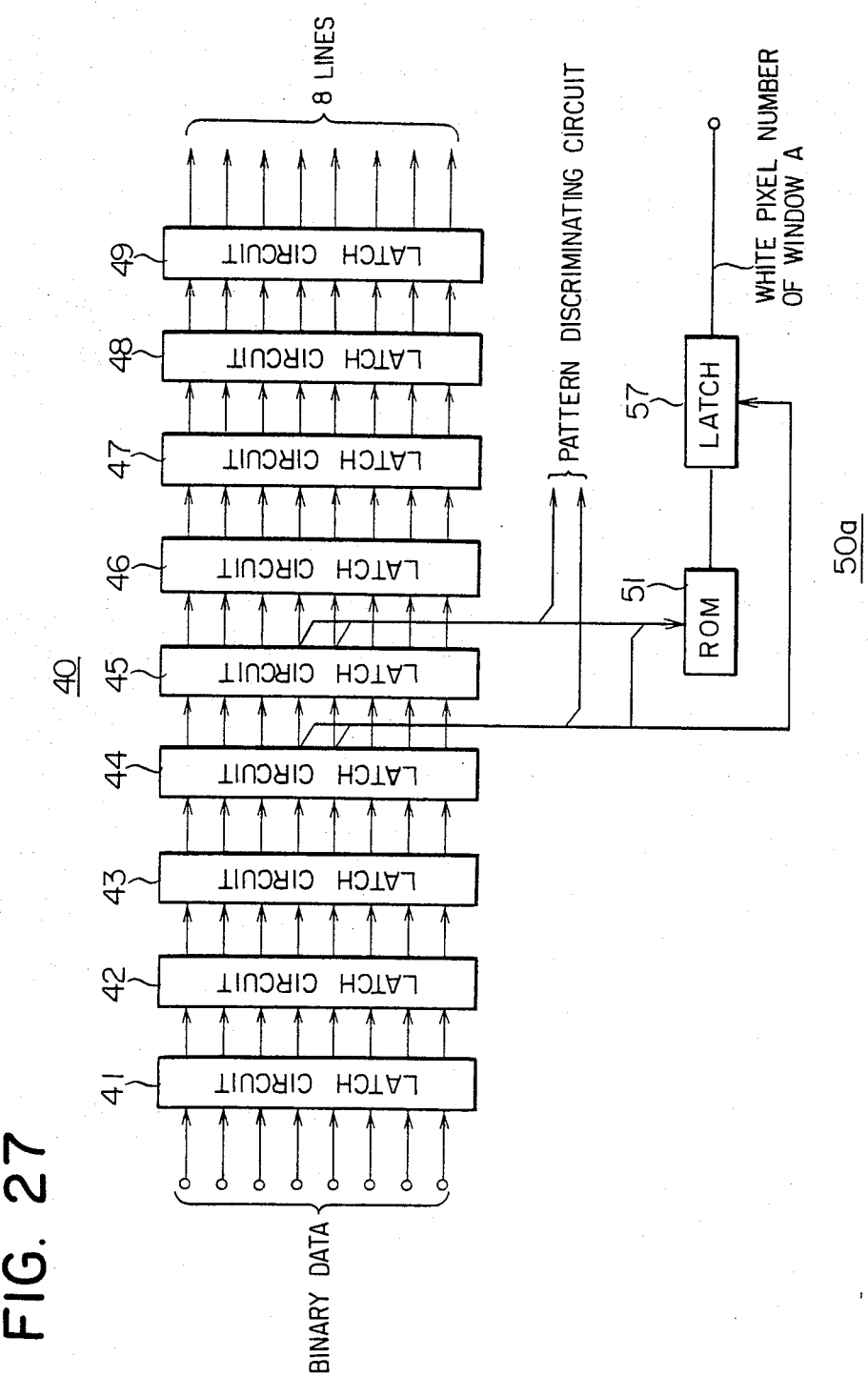

FIG. 25 shows an example of computing circuit 50c used for the scanning window C; FIG. 26, an example of computing circuit 50b used for the scanning window B; and FIG. 27, an example of computing circuit 50a and 50z used for the scanning windows A and Z, respectively.

The shift register is properly selected depending upon the number of rows and the number of columns of the scanning window. Moreover, the register comprises a computing ROM and a latch circuit.

The explanation of computing operation of the number of white pixels in respective circuit is omitted.

In the numbers of white pixels within each scanning window, calculated above, each number of white pixels within the scanning windows A through D and Z are transferred into the density pattern discriminating circuit 60. The numbers of white pixels within the scanning windows D through G are transferred into the conditional inequality judgement circuit 70.

The density pattern discriminating circuit 60 comprises density pattern ROMs 61a through 61d and pattern discriminating parts 65a through 65d as shown in FIG. 28.

Each computing data from the computing circuit 50a through 50d are transferred as high-order addresses to the corresponding density pattern ROMs 61a through 61d. The position information of the scanning window when computing the number of white pixels are transferred, in common, as low-order addresses.

Figure 29:
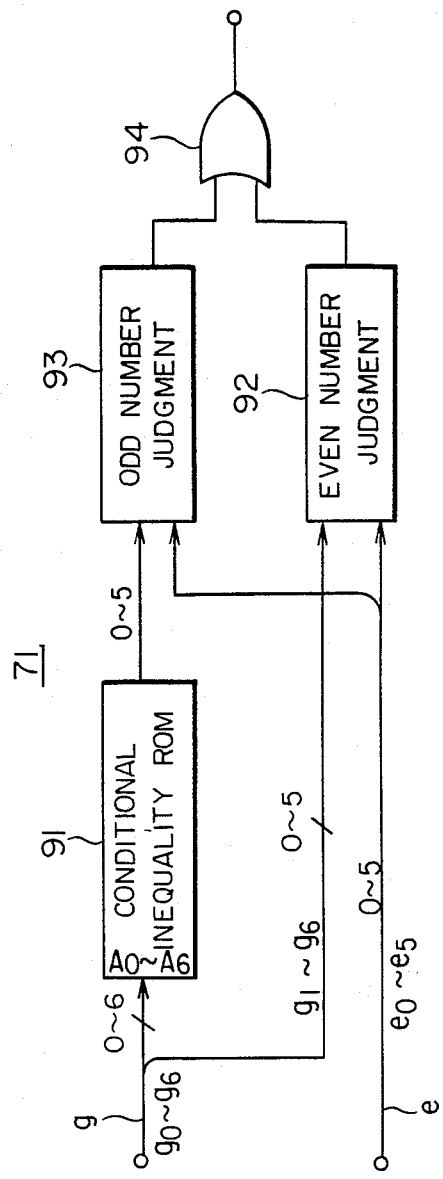
FIG. 29 is a block diagram showing a conditional inequality judgement circuit.

Since the pattern of the scanning window D is constituted by 16 dots, a pare of ROM 62d and 63d, as shown in FIG. 29-b, respectively having density pattern data corresponding to 2 rows (or 2 columns) is used as the density pattern ROM 61a ~ 61d.

The position information means the data for determining the threshold value matrix shown in FIG. 7-c. Therefore, the halftone image shown in FIG. 7-b is formed by the high-order address, and the re-binary coded image data corresponding to the density pattern shown in FIG. 7-d is outputted by this halftone image and the position information.

This re-binary coded image data and the density pattern data (binary code image data shown in FIG. 7-a), from which the re-binary coded image data obtained, are transmitted into the pattern discriminating parts 65a through 65d, thereby these patterns are compared and detected whether or not they are coincident with each other.

When they are coincident with each other, a "1" (high level) is outputted. When they are not coincident with each other, a "0" (low level) is outputted.

The density pattern ROM of the re-binary coded image data used for the density pattern discrimination is now explained.

As stated in relation to the method of discriminating the density pattern, the re-binary coded image data is produced by using the white pixels number and the position information.

FIG. 28 shows one example of output pattern in the event that, when using the scanning window D, the white pixel number d is 1. As shown in FIG. 28, even if the white pixel number is identical, the density pattern will be changed to 16 kinds of patterns corresponding to the position information in the example. The reasons is that the scanning window D consists of (4×4) matrix arrangement. Therefore, the addressing for the density pattern ROM is carried out by using both the low-order address (2 bit data) indicating the position information with respect to the main scanning direction and the high-order address (2 bit data) indicating the position information with respect to the sub-scanning direction.

The conditional inequality judgement circuit 70 has judgement circuits 71 through 75 for judging the conditional inequalities (1) through (5) as shown in FIG. 29. Data of the number of white pixels corresponding to each of the judgement circuits are transferred into the circuits.

Conditional inequality (5) is provided because of the following reason: it was confirmed by various types of experiments that noise appearing as white or black dots in the estimated image can be produced and the image quality is damaged if the estimation process of character image is executed while ignoring this condition.

The judgement circuits 71 through 74 are constructed in the same manner. Therefore, only the judgement circuit 73, which judges conditional inequality (3), will be explained referring the example.

Developing conditional inequality (3) obtains the following:

$$-1 \leq 2E - g \leq 1 \qquad (6)$$

$$(g-1)/2 \leq e \leq (g+1)/2 \qquad (7)$$

Calculating a value of e corresponding to a value of g using equation (7), it is determined that e can have two values when g is an odd number as shown in FIG. 30. Therefore, by providing a conditional inequality ROM 91 as shown in FIG. 29, it makes possible to output one value (one of the answers of the conditional inequality) of the e values from the conditional inequality ROM 91 corresponding to the input value if g is an odd number Now referring FIG. 29, the white pixels number signal g indicating the number of white pixels within the scanning window G is represented by using 7 bit configuration ($g_0$–$g_6$) and the address of the conditional inequality ROM 91 is denoted as $A_0$–$A_6$. In this arrangement, the LSB (Least significant Bit) $g_0$ of the white pixels number signal g is inputted to the MSB (Most Significant Bit) $A_6$ of the address bits of the conditional inequality ROM 91 and then the rest 6 bits $g_1$–$g_6$ are correspondingly inputted into the rest address bits $A_0$–$A_5$ in the order as shown in FIG. 31 which indicates a part of the contents of the conditional inequality ROM 91.

By addressing in the above manner, the conditional inequality ROM output the data indicated in FIG. 31 into the odd number judgement circuit 93, the outputted data corresponds to solution of the conditional inequality (7) with respect to the inputted white pixels number g. In the odd number judgement circuit 93, the white pixels number signal e indicating the number of white pixels within the scanning window E is compared with the solution data outputted from the conditional inequality ROM 91 whether or not coincident with it.

On the other hand, the above rest 6 bits $g_1$–$g_6$ are simultaneously further inputted into the even number judgement circuit 92 and then the white pixels number signal e is also compared with the modulation data represented by the 6 bits $g_1$–$g_6$ whether or not coincident with it.

Hereinbelow, the detailed examples are explained.
(1) Assuming that g=1 (0000001), and e=0 (000000).

The solution data 1 (000001) is outputted from the conditional inequality ROM 91 and introduced into the odd number judgement circuit 93 and then the judgement is carried out between the solution data (000001) and the white pixels number signal e (000000), thereby obtaining the result of "non coincidence".

The modulation data (000000) represented by the 6 bits $g_1$–$g_6$ except $g_0$ (1) is inputted into the even number judgement circuit 92 and then the judgement is carried out between the modulation data (000000) and the white pixels number signal e (000000), thereby obtaining the result of "coincidence".

In the result, the white pixels number signal e satisfies the conditional inequality (7), thereby obtaining the flag signal "H".
(2) Assuming that g=4 (0000100), e=1 (000001).

The solution data 2 (000010) is outputted from the conditional inequality ROM 91 and then judgement is carried out between (000010) and (000001) in the odd number judgement circuit 93, thereby obtaining the result of "non coincidence".

The modulation data (000010), which just corresponds to 2, is introduced into the even number judgement circuit 92 and then the judgement is carried out between (000010) and (000001), thereby obtaining also the result of "non coincidence".

In this case, the white pixels number signal e does not satisfy the conditional inequality (7), thereby obtaining the flag signal "L".

Incidentally, it is appreciated from the above explanation, although FIG. 31 indicates one example of the conditional inequality ROM 91 which stores the solution data in relation to both the odd number and the even number of the white pixels number signal g, it is possible to store the solution data only for the odd number because, the modulation data can be used as the solution data for the even number.

As clearly understood from FIG. 31, the ROM is constructed so that the contents of output data can be easily understood by changing the address depending on whether the number of white pixels within the scanning window G is an odd number or an even number.

Figure 32:
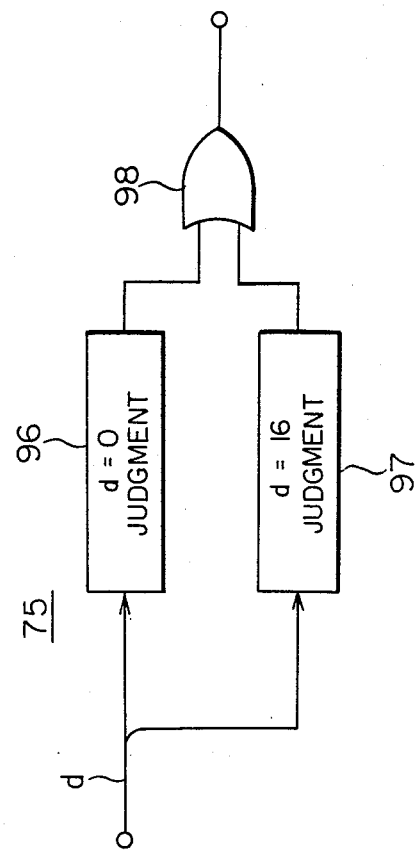
FIG. 32 is a block diagram showing another example of the conditional inequality discriminating circuit.

FIG. 32 shows an example of configuration for achieving conditional inequality (5). That is, the circuit comprises a judgement circuit 96 for judging d=0, a judgement circuit 97 for judging d=16, and an OR circuit 98. when d=0 or d=16, a "1" is outputted from the OR circuit.

Each output from the density pattern discriminating circuit 60 and the conditional inequality judgement circuit 70 is transferred into a window judgement circuit 80, thereby only one scanning window is selected. Selection conditions are as described above.

The window selection data comprise three bits data, which are transferred into the selection circuit 24 shown in FIG. 19. Into this selection circuit 24, are the following data are transferred.

That is, each computing data from the computing means 50 are transferred into the multiplier 33 via the register 32, and each value is obtained by multiplying the number of white pixels within each scanning window from a through g or z by the gain of respective window. Therefore, data from 1g through 64z that is, halftone image data are outputted from the multiplier 33 and these data are transferred into the selection circuit 24. In the selection circuit 24, only one halftone image datum is selected by the above mentioned window selection data.

These processing operations are executed per each target pixel. The operation concerning the dither image shown in FIG. 2-c, that is, what scanning windows are selected and what estimated halftone image is obtained, are shown in FIG. 12.

As the dither image described above, a dither image obtained by the systematical dither method is preferable to a dither image obtained by the random dither or conditional dither method, because threshold values can be fitted into the scanning window of a maximum area. Moreover, a dither image of dispersed type, in which threshold value can be evenly fitted into the scanning window of a minimum area, is preferable. The Bayer type dither image, in which threshold value is perfectly dispersed, of the dispersed type dither images is the most preferable.

In the above described embodiment, the number of white pixels in the dither image is computed by the computing circuit 50. However, the number of black pixels may be computed. The shapes and the area of the above mentioned plurality of scanning windows are just examples.

As the dither image described above, a dither image obtained by the systematical dither method is preferable to a dither image obtained by the random dither or conditional dither method, because one threshold value can be fitted into the scanning window of a maximum area. Moreover, a dither image of dispersed type, in which threshold value can be evenly fitted into the scanning window of a minimum area, is preferable. The Bayer type dither image, in which threshold value is perfectly dispersed, of the dispersed type dither images is the most preferable.

In order to estimate halftone image, the number of white pixels within scanning windows are counted in the examples above. However, the method according to the present invention is not limited by these examples. The number of black pixels may be counted to estimate halftone images.

Any method can be used if the method estimates halftone image by using the ratio of white area to black area within the scanning window.

Moreover, the types and dimensions of the scanning windows are not limited those described above.

In the method according to the present invention, two judgement methods are used depending on judging status of a specific window. These methods can be used for estimation of not only halftone image but also of any image such as characters or line images.

As an original image, a binary coded dither image is used in the description above. It can be easily understood that the method according to the present invention can be applied for estimating halftone image level using multi coded image such as three-coded dither image.

As described above, the method according to the present invention is constructed so that a plurality of scanning windows of different area are prepared; high gradation expression is executed in the low spatial frequency range using a larger scanning window; and high resolution image is reproduced using small scanning windows in the low spatial frequency range. Thus, better estimation of halftone image can be obtained by this method.

That is, since halftone image is reproduced by the method in consideration with the pixel level gradation detection capability of human beings, a halftone image similar to the original halftone image can be obtained.

Various types of image processing such as gradation conversion, enlargement, or reduction can be achieved using thus obtained halftone image.

What is claimed is:

1. An image processing apparatus, for estimating a halftone image from original binary coded image data consisting of white pixels and black pixels, comprising:
   a plurality of memory means for storing the original binary coded image data and shift register means for storing a plurality of scanning windows, said scanning windows being capable of shifting relative to the original binary coded image data for estimating a halftone level of a target pixel;
   a counting circuit for counting the number of white pixels or black pixels within each of the plurality of scanning windows and generating a count signal in proportion thereto,
   a first judgment circuit for comparing the density pattern between selected coded image data and the original binary coded image data and generating a first judgment result signal in response to the comparison, said selected coded image data being obtained by selecting from a plurality of coded image data stored in density pattern storage means in response to the value of the count signal, a second judgment circuit having a conditional formula circuit for performing a predetermined conditional algorithm based on the value counted in said counting circuit and generating a second judgment result signal in response to the performance of the predetermined conditional algorithm, a third judgment circuit having a predetermined truth table for selecting one scanning window from among the plurality of scanning windows in response to said first and second judgment result signals.

2. The apparatus of claim 1, wherein there is provided a datum scanning window having a middle size among the plurality of scanning windows, the plurality of scanning windows being separated into two groups of which the first group consists of the datum scanning window and a scanning window smaller than the datum scanning window and the second group consists of the datum scanning window and the scanning windows larger than the datum scanning window, and wherein the first group is subjected to said first judgment circuit and the second group is subjected to said second judgment circuit.

3. The apparatus of claim 1, wherein the threshold value matrix is identical with a threshold value matrix used for obtaining the original binary coded image data.

4. The apparatus of claim 3, wherein said first judgment circuit has a density pattern ROM for storing a density pattern of the coded image data which is predetermined with respect to possible values counted in said counting circuit based on the threshold value matrix and said density pattern ROM changes an outputting density pattern in response to a position information of the original binary image data within the unit area.

5. The apparatus of claim 4,
wherein the threshold value matrix is a dither matrix.

6. The apparatus of claim 1, wherein said conditional formula circuit comprises a conditional inequality circuit defining a predetermined conditional inequality relation between a first and a second value among the values counted in said counting circuit with respect to each of the plurality of scanning windows, and wherein said conditional inequality circuit comprises a ROM for storing a solution data of the predetermined conditional inequality relation.

7. The apparatus of claim 6, wherein said ROM is adapted to be addressed with the first value, thereby outputting the solution data to a comparison circuit being provided in said conditional inequality circuit, and wherein said comparison circuit performs comparison judgment whether or not the second value is coincident with the solution data.

8. The apparatus of claim 7, wherein the first and second values are represented by plural binary bits, wherein the plural binary bits representing the first value is rearranged such that the least significant bit is shifted to the position of the most significant bit and the remaining bits are carried down by one bit, and wherein said ROM is addressed with the rearranged plural binary bits of the first value.

9. The apparatus of claim 8, wherein the said comparison circuit comprises two sets of sub-comparison circuits of which the first comparison circuit performs the comparison judgment between the solution data and the second value and the second comparison circuit performs the comparison judgment between the remaining bits except the least significant bit of the first value and the second value.

10. An image processing apparatus for estimating a halftone image from an original binary coded image, the original binary coded image including white pixels and black pixels in the form of original binary coded image data, the apparatus comprising:

memory means for storing the original binary coded image data and for storing a plurality of scanning windows;

shifting means for superimposing a selected one of said plurality of scanning windows on the original binary coded image data and for shifting said selected one of said plurality of scanning windows relative to the original binary coded image data;

counting means for counting the number of white pixels or black pixels in the original binary coded image data within the selected one of the plurality of scanning windows superimposed on the original binary coded image data and generating a count result signal in response thereto; and means for generating an average pixel level matrix proportional to the count result signal and the gain of the selected one of said plurality of scanning windows;

first judgment means for comparing said average pixel level matrix with a threshold value matrix and generating a first judgment result signal in response thereto;

second judgment means for performing a predetermined conditional algorithm based on the value counted in said counting circuit and generating a second judgment result signal in response thereto;

third judgment means for selecting one scanning window from among the plurality of scanning windows in response to said first and second judgment result signals.

11. The apparatus of claim 10, wherein said third judgment means includes a truth table for selecting said one scanning window.

12. The apparatus of claim 10, wherein said second judgment means includes a conditional inequality circuit defining a predetermined conditional inequality relation between a first and a second count result signal generated by said counting means.

13. The apparatus of claim 10, wherein said plurality of scanning windows includes a datum scanning window having a predetermined size, the plurality of scanning windows including a first group including said datum scanning window and at least one scanning window smaller than said datum scanning window and a second group including said datum scanning window and at least one scanning window larger than said datum scanning window.

14. The apparatus of claim 13, wherein said first judgment means generates a first judgment result signal in relation to said first group of scanning windows and said second judgment means generates a second judgment result signal in relation to said second group of scanning windows.

15. An image processing apparatus, for estimating a halftone image from original binary image data in the form of data representing a line of pixels corresponding to a scanning line, comprising:

(A) memory means for storing a plurality of lines of original binary image data representing a plurality of lines of pixels;

(B) a plurality of scanning windows for enclosing a predetermined part of said plurality of lines of original binary image data, including therein data representing a target pixel, each of said plurality of scanning windows having a different window configuration so as to enclose a predetermined number of data representing a predetermined number of pixels;

(C) a counting circuit for counting either one of two components of binary image data so that each of said plurality of scanning windows is assigned a counted value corresponding to the enclosed part of the original binary image data;

(D) a first judgment circuit for performing a first judgment for each of a first group of said plurality of scanning windows, said first judgment circuit including;

(i) means for producing binary image data on the basis of the counted value as well as the window configuration; and (ii) means for comparing a density pattern of the produced binary image data with that of the enclosed original binary image data and for outputting a first judgment signal on the basis of the comparison result;

(E) a second judgment circuit for performing a second judgment for the second group of said plural kinds of scanning windows, said second judgment circuit having a conditional formula circuit for performing a predetermined conditional algorithm by using the counted values of the second group of said plurality of scanning windows and for outputting a second judgment signal on the basis of a result of the conditional algorithm, (F) a third judgment circuit having a predetermined truth table for selecting one scanning window from said plurality of scanning windows in response to the judgment signals outputted from said first and second judgment circuits, and (G) means for determining the halftone level of the target pixel on the basis of the selected scanning window.

16. The apparatus of claim 15, wherein there is provided a datum scanning window having a middle size among the plurality of scanning windows, the plurality of scanning windows being separated into two groups of which the first group consists of the datum scanning window and a scanning window smaller than the datum scanning window and the second group consists of the datum scanning window and the scanning windows larger than the datum scanning window, and wherein the first group is subjected to said first judgment circuit and the second group is subjected to said second judgment circuit.

17. The apparatus of claim 15, wherein the threshold value matrix is identical with a threshold value matrix used for obtaining the original binary coded image data.

18. The apparatus of claim 17, wherein said first judgment circuit includes a density pattern ROM for storing a density pattern of the coded image data which is predetermined with respect to possible values counted in said counting circuit based on the threshold value matrix and said density pattern ROM changes an outputting density pattern in response to a position information of the original binary image data within the unit area.

19. The apparatus of claim 18 wherein the threshold value matrix is a dither matrix.

20. The apparatus of claim 15, wherein said conditional formula circuit comprises a conditional inequality circuit defining a predetermined conditional inequality relation between a first and a second value among the values counted in said counting circuit with respect to each of the plurality of scanning windows, said conditional inequality circuit including a ROM for storing a solution data of the pre-determined conditional inequality relation.

21. The apparatus of claim 20, wherein said ROM is adapted to be addressed with a first value, thereby outputting a solution data to a comparison circuit being provided in said conditional inequality circuit, said comparison circuit performing a comparison judgment whether or not the second value is coincident with the solution data.

22. The apparatus of claim 21, wherein the first and second values are represented by plural binary bits, the plural binary bits representing the first value are rearranged such that the least significant bit is shifted to the position of the most significant bit and the remaining bits are carried down by one bit, said ROM being addressed with the rearranged plural binary bits of the first value.

23. The apparatus of claim 22, wherein the said comparison circuit comprises two sets of sub-comparison circuits of which the first comparison circuit performs the comparison judgment between the solution data and the second value and the second comparison circuit performs the comparison judgment between the remaining bits except the least significant bit of the first value and the second value.

* * * * *

UNITED STATES PATENT AND TRADEMARK OFFICE
CERTIFICATE OF CORRECTION

PATENT NO.  : 4,903,142
DATED       : February 20, 1990
INVENTOR(S) : Takashi Hasebe et al.

It is certified that error appears in the above-identified patent and that said Letters Patent is hereby corrected as shown below:

Title Page
In the Abstract

Line 13, "algorism" should be --algorithm--;

Claim 8, Column 19, Line 63, "is" should be --are--.

Signed and Sealed this

Twenty-fifth Day of August, 1992

Attest:

DOUGLAS B. COMER

Attesting Officer

Acting Commissioner of Patents and Trademarks